(12) United States Patent
Reiserer et al.

(10) Patent No.: US 12,367,415 B2
(45) Date of Patent: Jul. 22, 2025

(54) PHOTONIC ELEMENT FOR A QUANTUM INFORMATION PROCESSING DEVICE AND METHOD FOR PRODUCING SUCH

(71) Applicant: Max-Planck-Gesellschaft zur Förderung der Wissenschaften e.V., Munich (DE)

(72) Inventors: Andreas Reiserer, Bad Tölz (DE); Andreas Gritsch, Tegernsee (DE); Lorenz Weiss, Munich (DE)

(73) Assignee: Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 0 days.

(21) Appl. No.: 18/533,311

(22) Filed: Dec. 8, 2023

(65) Prior Publication Data

US 2024/0144067 A1 May 2, 2024

Related U.S. Application Data

(63) Continuation of application No. PCT/EP2022/065281, filed on Jun. 3, 2022.

(30) Foreign Application Priority Data

Jun. 11, 2021 (WO) ................. PCT/EP2021/065870

(51) Int. Cl.
*G06N 10/40* (2022.01)
*B82Y 20/00* (2011.01)
*G02B 6/12* (2006.01)

(52) U.S. Cl.
CPC .................................. *G06N 10/40* (2022.01)

(58) Field of Classification Search
CPC .... G06N 10/40; G02B 6/1342; G02B 6/1223; G02B 2006/12061; G02B 2006/1208; B82Y 10/00; B82Y 20/00
See application file for complete search history.

(56) References Cited

U.S. PATENT DOCUMENTS

| | | | |
|---|---|---|---|
| 7,440,180 B2 | 10/2008 | Tang | |
| 2002/0117673 A1* | 8/2002 | Moon | H01L 33/26 |
| | | | 257/E33.041 |

(Continued)

FOREIGN PATENT DOCUMENTS

| | | |
|---|---|---|
| CN | 1985418 A | 6/2007 |
| TW | 201802884 A | 1/2018 |

(Continued)

OTHER PUBLICATIONS

Priolo Francesco et al: "Excitation and nonradiative deexcitation processes of Er 3+ in crystalline Si", Phys Rev B, vol. 57, No. 8, Feb. 15, 1998 (Year: 1998).*

(Continued)

*Primary Examiner* — Nghia M Doan
(74) *Attorney, Agent, or Firm* — Tautz & Schuhmacher LLC

(57) ABSTRACT

A photonic element for a quantum information processing device contains a high-purity silicon layer. The high-purity silicon layer contains integrated rare-earth element (REE) dopants at a concentration of $10^{19}$ $cm^{-3}$ or less. An optical transition between the lowest crystal field levels of the REE dopants integrated in the high-purity silicon layer exhibits a homogeneous linewidth of 1 MHz or less at a temperature of 4 K or less. A method for producing such a photonic element is also disclosed.

51 Claims, 7 Drawing Sheets

(56) References Cited

U.S. PATENT DOCUMENTS

| | | | |
|---|---|---|---|
| 2007/0114628 | A1 | 5/2007 | Barrios et al. |
| 2013/0156364 | A1 | 6/2013 | Chen et al. |
| 2019/0122885 | A1 | 4/2019 | Dargis et al. |
| 2021/0096311 | A1 | 4/2021 | Yu et al. |
| 2022/0199402 | A1* | 6/2022 | Ganguly ............. H10D 84/017 |
| 2022/0337021 | A1* | 10/2022 | Bradley ............... H01S 3/1616 |

FOREIGN PATENT DOCUMENTS

| | | |
|---|---|---|
| TW | 202113410 A | 4/2021 |
| WO | 2016145310 A1 | 9/2016 |
| WO | 2021030724 A1 | 2/2021 |

OTHER PUBLICATIONS

Kenyon (Erbium in Silion, Semiconductor Science and Technology 20 (Nov. 2005), pp. R65-R84) (Year: 2005).*

Borghesi et al.: "Oxygen Precipitation in Silicon," Journal of Applied Physics, vol. 77, No. 9, pp. 4169 to 4244, May 1995.

Priolo et al.: "Excitation and nonradiative deexcitation processes of Er 3+ in crystalline Si," Physical Review B, vol. 57, No. 8, pp. 4443 to 4455, Feb. 1998.

Vinh et al.: "Photonic Properties of Er-Doped Crystalline Silicon," Proceedings of the IEEE, vol. 97, No. 7, pp. 1269 to 1283, Jul. 2009.

Faraon et al.: "Resonant enhancement of the zero-phonon emission from a colour centre in a diamond cavity," Nature Photonics, vol. 5, pp. 301 to 305, Apr. 2011.

Thiel et al.: "Rare-earth-doped materials for applications in quantum information storage and signal processing," Journal of Luminescence vol. 131, pp. 353 to 361, Apr. 2011.

Yin et al.: "Optical addressing of an individual erbium ion in silicon," Nature, vol. 497, pp. 91 to 94, May 2013.

Lodahl et al.: "Interfacing single photons and single quantum dots with photonic nanostructures," Review of Modern Physics, Vo. 87, No. 2, pp. 347 to 400, May 2015.

Reiserer et al.: "Cavity-based quantum networks with single atoms and optical photons," Reviews of Modern Physics, vol. 87, No. 4, pp. 1379 to 1418, Jul. 2015.

Sipahigil et al.: "An integrated diamond nanophotonics platform for quantum-optical networks," Science Research Articles, vol. 354, Issue 6314, pp. 847 to 850, Nov. 2016.

Dibos et al.: "Individual erbium dopants as a source of single photons in the telecom band," Physical Review Letter, vol. 120, Issue 24, Jun. 2018.

Chartrand et al.: "Highly enriched 28Si reveals remarkable optical linewidths and fine structure for well-known damage centers," Physical Review B, vol. 98, Issue 19, pp. 1 to 8, Nov. 2018.

Anderson et al., "Electrical and optical control of single spins integrated in scalable semiconductor devices," Science Research Articles, vol. 366, pp. 1225 to 1230, Dec. 2019.

Craiciu et al.: "Multifunctional on-chip storage at telecommunication wavelenght for quantum networks," Aug. 2020.

Chen, et al: "Parallel single-shot measurement and coherent control of solid-state spins below the diffraction limit," Science, vol. 370, Issue 6516, pp. 592 to 595, Oct. 2020.

Askarani et al.: "Persistent atomic frequency comb based on Zeeman sub-levels of an erbium-doped crystal waveguide," Journal of the Optical Society of America B, Optical Physics, vol. 37, Issue 2, pp. 1 to 6, Nov. 2020.

Weiss et al.: "Erbium dopants in silicon nanophotonic waveguides," Optica, vol. 8, Issue 1, pp. 40 to 41, Jan. 2021.

Wolfowicz et al.: "Qubit guidelines for solid-state spin defects," Nature Reviews Materials, vol. 6, Oct. 2021.

Wicker et al.: "Telecom Spin-Photon Quantum Interface Based on Silicon Nanophotonics", CLEO, 2021.

International Search Report and Written Opinion issued in PCT/EP2021/065870, to which this application claims priority, mailed Feb. 22, 2022.

International Search Report and Written Opinion issued in PCT/EP2022/065281, to which this application claims priority, mailed Oct. 21, 2022.

Office Action by the Taiwan Intellectual Property Office (TIPO) issued in TW 111121294, which is a counterpart hereof, mailed on Jun. 2, 2023, and English translation thereof.

Kenyon, "Erbium in silicon," Semiconductor Science and Technology, vol. 20, No. 12, pp. R65 to R84, Nov. 2005.

Zhang et al., "Single rare-earth ions as atomic-scale probes in ultrascaled transistors," Nano letters, vol. 19, No. 8, pp. 5025 to 5030, Jun. 2019.

Berkman et al., "Observing Er3+ sites in Si with an In Situ Single-Photon Detector," Physical Review Applied, vol. 19, No. 1, pp. 1 to 11, Jan. 2023.

Office Action by the Taiwanese Patent Office (TIPO) issued in TW111121294, which is a counterpart hereof, mailed on Dec. 4, 2023, and English translation thereof.

Notice of Allowance by the Taiwanese Patent Office (TIPO) issued in TW111121294 dated Apr. 2, 2024, and English translation thereof.

S. Simmons: "A single silicon colour centre resolved," Nature Electronics, vol. 3, No. 12, pp. 734-735, Dec. 1, 2020.

International Preliminary Report on Patentability issued in PCT/EP2021/065870, to which this application claims priority, issued Nov. 21, 2023.

International Preliminary Report on Patentability issued in PCT/EP2022/065281, to which this application claims priority, issued on Nov. 21, 2023.

* cited by examiner

PHOTONIC ELEMENT FOR A QUANTUM INFORMATION PROCESSING DEVICE AND METHOD FOR PRODUCING SUCH

CROSS REFERENCE TO RELATED APPLICATIONS

This application is a continuation application of international patent application PCT/EP2022/065281, filed on Jun. 3, 2022 and designating the U.S., which claims priority to PCT/EP2021/065870, filed Jun. 6, 2021, both of which are hereby incorporated by reference in their entireties.

TECHNICAL FIELD

Exemplary embodiments relate to a photonic element for a quantum information processing device, an optical waveguide, an optical resonator, a single-photon emitter, a quantum repeater, a quantum information processing device, a signal converter for converting microwave signals into optical signals, an optical interconnection, uses of a photonic element and methods for producing a photonic element. The exemplary embodiments are, thus, related to quantum information technology.

BACKGROUND

Individual dopants and ensembles of them in a semiconductor device are promising systems for quantum technology, including quantum communication, quantum computation, quantum simulation, and quantum sensing. If the dopants used can be excited and controlled by optical fields, this allows for low-crosstalk addressing and optical connection (see G. Wolfowicz et al., Nature Reviews Materials 1 (2021)) which is promising for the development of scalable quantum technology, in particular when the dopants are integrated into optical waveguides or resonators (P. Lodahl et al.: Rev. Mod. Phys. 87, 347 (2015), S. Chen, et al: Science 370, 592 (2020)). Conventional approaches known in related art trying to achieve this integration come along with various challenges which are to be overcome.

For instance, doped waveguides may be provided by carving out from a bulk crystal (see A. Faraon et al.: Nat. Photon. 5, 301 (2011) and A. Sipahigil et al.: Science 354, 847 (2016)), which is difficult to fabricate in a scalable way using established fabrication techniques (such as a Complementary metal-oxide-semiconductor (CMOS) manufacturing process). Furthermore, dopants in an exponentially decaying evanescent field of a nanostructure made from a different material (see A. M. Dibos et al.: Phys. Rev. Lett. 120, 243601 (2018)) are challenging to manufacture and suffer from an unavoidable proximity to interfaces. Conventional waveguides made by ion diffusion often suffer from crystalline disorder that leads to considerable broadening of the optical transitions and, hence, to decoherence of embedded emitters, which is undesired for quantum information applications.

An alternative approach known in related art is based on implanting the emitters into waveguides that have been fabricated beforehand. In principle, many different types of emitters and hosts can be used in this approach. For example, erbium dopants implanted into waveguides made on a silicon-on-insulator (SOI) chip (see L. Weiss et al.: Optica 8, 40 (2021)) show promising optical properties, which are comparable to that observed in the best host crystals for this particular dopant (see C. W. Thiel et al.: Journ. Lumin. 131, 353 (2011)) but suffer from a largely increased homogeneous linewidth of more than 45 MHz at cryogenic temperatures of <2K, which renders such devices unsuitable for quantum information applications. The increased homogeneous linewidth of these devices is mainly attributed to fluctuating charges, impurities and implantation damage centers in the waveguides, which were fabricated from a Cz-grown bulk crystal using the SmartCut technique. In this way, the properties of the bulk crystal, in particular the strain, purity, and isotopic composition, mainly determine the emitter properties. Controlling the latter parameters, in particular the purity and the density of defects, in bulk crystals is, however, challenging and expensive.

Moreover, it is known from the related art to use devices made of crystalline silicon doped with erbium dopants for producing light emitting devices, as described for example in Vinh et al.: *Photonic Properties of Er-Doped Crystalline Silicon*, Proceedings of the IEEE, 97, No. 7 (2009). In such devices the crystal field levels of the erbium dopants are coupled to the conduction band states of the silicon crystal, which increases the linewidth, preventing its use for quantum information processes. In addition, erbium-oxygen clusters are often formed, which further broaden the linewidth.

Document WO 2021/030724 A1 describes a heterogeneous rare-earth doped system used as a quantum transducer to coherently convert between signals in different systems. The heterogeneous system has a rare-earth oxide layer doped with rare-earth dopants. The publication Chunming Yin et al.: "Optical addressing of an individual erbium ion in silicon", Nature 497, 91-94 (2013) describes a silicon-based single electron transistor for addressing a single erbium ion.

SUMMARY

It is thus desired to provide devices having suitable properties for quantum information applications and allowing a limited production effort and a scalable production.

Exemplary embodiments relate to a photonic element for a quantum information processing device, an optical waveguide, an optical resonator, a single-photon emitter, a quantum repeater, a quantum information processing device, a signal converter for converting microwave signals into optical signals, an optical interconnection, uses of a photonic element and methods for producing a photonic element. Exemplary embodiments are presented in the description.

One exemplary embodiment relates to a photonic element for a quantum information processing device, the photonic element comprising a high-purity silicon layer, wherein the high-purity silicon layer contains integrated rare-earth element dopants, REE dopants, at a concentration of $10^{19}$ cm$^{-3}$ or less. The optical transition between the lowest crystal field levels of the REE dopants integrated in the high-purity silicon layer exhibits a homogeneous linewidth of 10 MHz or less at a temperature of 4 K or less. Optionally the homogeneous linewidth may be 1 MHz or less at a temperature of 20 K or less and/or 100 kHz at a temperature of 12 K or less.

Another exemplary embodiment relates to an optical waveguide comprising a photonic element according to an exemplary embodiment.

Yet another exemplary embodiment relates to an optical resonator comprising a photonic element according to an exemplary embodiment and one or more reflectors forming a resonator cavity at least partly containing the photonic element.

Yet another exemplary embodiment relates to a single-photon emitter comprising a photonic element according to an exemplary embodiment and/or an optical waveguide according to an exemplary embodiment and/or an optical resonator according to an exemplary embodiment.

Yet another exemplary embodiment relates to a quantum repeater comprising a photonic element according to an exemplary embodiment, wherein the photonic element is optionally adapted to serve as a quantum memory for photons, and/or a single-photon emitter according to an exemplary embodiment.

Yet another exemplary embodiment relates to a quantum information processing device comprising a photonic element according to an exemplary embodiment, wherein the photonic element is optionally adapted to serve as a quantum memory for photons, and/or an optical waveguide according to an exemplary embodiment and/or an optical resonator according to an exemplary embodiment.

Yet another exemplary embodiment relates to a signal converter for converting microwave signals into optical signals in the telecommunications wavelength range, wherein the signal converter comprises a photonic element according to an exemplary embodiment and/or an optical waveguide according to an exemplary embodiment and/or an optical resonator according to an exemplary embodiment.

Yet another exemplary embodiment relates to an optical interconnection between remote quantum computers or between parts of a quantum computer, wherein the optical interconnection comprises a photonic element according to an exemplary embodiment and/or an optical waveguide according to an exemplary embodiment and/or an optical resonator according to an exemplary embodiment. In particular, the interconnection may be used as a bus system for quantum computers.

Yet another exemplary embodiment relates to a use of a photonic element according to an exemplary embodiment for optically reading and/or controlling the state of a spin qubit.

Yet another exemplary embodiment relates to a use of a photonic element according to an exemplary embodiment and/or an optical waveguide according to an exemplary embodiment and/or an optical resonator according to an exemplary embodiment towards a photon-mediated quantum gate between two or more quantum bits (qubits). The effect of this quantum gate may be a state change of one or several qubits that depend on the state of one or several other qubits (see, e.g., A Reiserer and G. Rempe, Rev. Mod. Phys. 87, 1379 (2015)), wherein one or more or all of the involved qubits may be based on REE dopants in the photonic element.

Yet another exemplary embodiment relates to a method for producing a photonic element for a quantum information processing device. The method comprises a step of providing a high-purity silicon layer and a step of integrating rare-earth element dopants, REE dopants, into the high-purity silicon layer, such that the high-purity silicon layer comprises integrated REE dopants at a concentration of $10^{19}$ $cm^{-3}$ or less.

A photonic device is a device, in particular a semiconductor device, for photonic applications. In particular, a photonic device may be suitable for applications based on the interaction of electromagnetic fields at visible and infrared wavelengths with matter, as well as the interaction of electromagnetic fields at visible, infrared, microwave and/or other frequencies mediated by matter. The photonic device may be at least partly transparent for electromagnetic radiation in a spectral range of the intended light-matter interaction, in particular for wavelengths in the telecommunications wavelength range.

A quantum information processing device is a device usable for the generation and/or reception and/or storage and/or processing of quantum information. In particular, the quantum information processing device may be adapted to comprise and/or host one or more quantum systems and allow the one or more quantum systems to reach and maintain a coherent quantum state for a certain period of time that is sufficient for its processing and/or readout. In particular, the coherence time of the coherent quantum states should be longer than a temporal spread of a wavepacket used for processing and/or reading out the quantum state. The quantum information system may be configured to bring one or more quantum systems in a predetermined quantum state and/or to readout and/or manipulate a quantum state of a quantum system.

A high-purity silicon layer is a layer of silicon having a low concentration of impurities. The degree of the purity and/or the maximum concentration of impurities may depend on the specific application and materials and, thus, may be different for different devices. However, the high-purity silicon layer is required to have a purity such as to allow the REE dopants having a homogeneous linewidth of 10 MHz or less at a temperature of 4 K or less and optionally 10 MHz at a temperature of 20 K or less, and optionally a linewidth of 200 kHz or less at a temperature of 12 K or less. In some exemplary embodiments, the REE dopants may have a homogeneous linewidth of 20 kHz or less at a temperature of 2 K. The high-purity silicon layer may particularly have a low concentration of oxygen impurities, such as $5 \cdot 10^{18}$ $cm^{-3}$ or less or even $1 \cdot 10^{18}$ $cm^{-3}$ or less. In addition, the concentration of any other impurity which may influence the optical properties of the REE dopants, may be very low, in particular $5 \cdot 10^{18}$ $cm^{-3}$ or less or even $1 \cdot 10^{18}$ $cm^{-3}$ or less. Moreover, the high-purity silicon layer may have an impurity concentration of foreign atoms of the $4^{th}$ main group of the periodic table, in particular carbon and germanium, of less than 1% compared to the number of silicon atoms. It is emphasized that in this respect the REE dopants are not regarded as impurity. The concentration of the REE dopants integrated into the high-purity silicon layer is specified as $1 \cdot 10^{19}$ $cm^{-3}$ or less. The high purity of the high-purity silicon layer may be achieved for instance by growing the high-purity silicon layer using an epitaxial technique or using wafers offering a suitably high purity.

The concentration of oxygen and/or any other contaminant or impurity and/or defect in the high-purity silicon layer relates to an effective concentration in regions of the high-purity silicon layer, in which the oxygen atoms, contaminants and defects, respectively, could interact with the REE dopants. Hence, having a high concentration of oxygen, other contaminants and/or defects in regions, where no REE dopants are integrated or actively used, such as in edge regions, shall not be considered as contributing to the effective concentration of the high-purity silicon layer. In any case, such parts which may have a high concentration of oxygen, other contaminants and/or defects may any ways not satisfy the above-specified criteria of a high-purity silicon layer and thus do not form part of the high-purity silicon layer. Throughout this disclosure the terms "contaminant" and "impurity" shall be used as synonyms.

The REE dopants being integrated in the high-purity silicon layer means that REE dopants are contained in the high-purity silicon layer in comparable manner as impurity atoms, although the dopants are not considered as an impurity. The integration of the REE dopants is independent of any specific integration technique. For instance, the REE dopants may be integrated by ion implantation and/or by an epitaxial technique and/or during growth from a melt.

The homogeneous linewidth, i.e., the homogeneous broadening of an emission linewidth of the REE dopants, corresponds to the reciprocal of the coherence time of the optical emission originating in the optical transition between the lowest crystal fields divided by $\pi$. A homogeneous linewidth of 10 MHz Full-Width-at-Half-Maximum, thus, corresponds to a coherence time of $10^{-7}$ s/$\pi$, i.e., 32 ns.

The lowest crystal field levels correspond to the respective states having the $m_J$ quantum number with the lowest-possible energy within a certain J-manifold of the electrons in the 4f shell. Thus, an electron occupies the lowest crystal field level when no further reduction of its energy can be achieved without changing the quantum number J. When a magnetic field is applied, the lowest crystal field is split twofold for the even isotopes of Kramers rare-earth elements; then, both of the split states belong to the lowest crystal field.

The REE dopant may be optically excited from the ground state with quantum number J to an excited state with a different J by absorbing a photon having a photon energy corresponding to the energy difference between the excited state and the ground state. Likewise, the REE dopant may radiatively relax from the excited state to the ground state by emitting a photon having the corresponding photon energy. Moreover, an REE dopant may be nonradiatively excited and/or nonradiatively relax from one sub-level to a lower sub-level by interaction with electrons in the semiconducting bands, or by phononic relaxation, i.e., by transferring phononic energy into the surrounding crystal structure, and/or by other relaxation or excitation mechanisms.

The REE dopants may be selected to provide an electron spin and/or nuclear spin for quantum information applications. For instance, the REE dopants may comprise erbium. Erbium dopants integrated into the high-purity silicon layer offer an electron spin, which may be used for quantum information applications. Moreover, the isotope $^{167}$Er provides a nuclear spin, which may be used for quantum information applications alternatively or additionally to the electronic spin. The electronic spin of erbium dopants may be addressed by microwave and optical radiation of a certain polarization or frequency. In particular, when a magnetic field is applied, the transitions between the individual spin states differ in energy. Thus, an optical excitation frequency may be selected to individually excite erbium dopants having a specific spin state and crystal field environment. In the same way, erbium dopants having a nuclear spin state may be addressed by microwave and optical radiation. In this case, even at zero magnetic field the energy levels will be split by the hyperfine interaction.

An optical waveguide is a photonic element adapted to guide electromagnetic radiation. In particular, an optical waveguide may allow coupling a light beam and/or a photon into the optical waveguide and confine the light beam and/or photon in a transversal direction, i.e., perpendicular to its propagation direction.

An optical resonator may be a photonic element adapted to confine a light wave coupled into the resonator cavity such as to propagate several times within the resonator cavity. The resonator cavity may comprise a photonic element configured as a waveguide, wherein one or several end surfaces of the waveguide exhibit a suitable reflectivity for confining the light wave in the resonator cavity for several round trips. In some exemplary embodiments, the optical resonator may be configured as a micro-ring resonator, as a photonic crystal resonator, as a micro-disc resonator, or as a Fabry-Perot resonator. The resonator may offer a small mode volume and high Q-factors and thus allow high coupling efficiencies between a light wave confined in the resonator and the REE dopants within the resonator. The resonator may exhibit a Purcell factor that is larger than 1. The photonic device and/or the optical resonator may be adapted as a quantum transducer for coherently converting between quantum information signals in different systems, such as from photons to an electronic and/or nuclear spin of one or more REE dopants or vice versa, and/or may optionally serve as an optical interconnection for remote quantum computers. Configuring the photonic element as a resonator may be beneficial for reducing the lifetime of an optical transition of the REE dopants.

A single-photon emitter is a light source configured to emit the light waves as single photons. Each of the emitted photons may be emitted by a single REE dopant. The emitted photon may carry a quantum state determined by the emitting REE dopant. In particular, the polarization and/or frequency and/or emission time of an emitted photon may depend on the previous and/or present electronic and/or nuclear spin of the emitting REE dopant. Alternatively, the single photon may be emitted by a collective state of several, or many REE dopants. Then, it may carry a quantum state that was previously encoded in the electronic or spin state of the emitting REE dopant ensemble.

A quantum repeater is a quantum information processing device that may be used to overcome the exponential loss-distance relation in quantum communication. As an example, this may be achieved by dividing a large distance into smaller segments over which lower-loss communication is possible. After entanglement is established in one inner segment, it is stored in a quantum memory until neighboring segments have also established entanglement. Then, local operations can be used to remove the innermost nodes from the entangled state while entangling nodes at larger distance.

A quantum memory is a quantum information processing device configured to store quantum information. For instance, the quantum memory may be adapted to convert quantum information provided as a polarization state and/or a frequency and/or an arrival time of a photon into a quantum information storable in a spin qubit using the electronic spin and/or the nuclear spin of a REE dopant. The quantum memory may be adapted to emit a photon carrying the stored quantum information from the spin qubit by means of an emitted photon having a polarization state and/or a frequency and/or an emission time related to the previously stored quantum information of the spin qubit.

A signal converter may be an electro-optic transduction system for converting quantum information encoded in optical radiation into microwave radiation and/or vice versa. To this end, the signal converter may be adapted to use a Raman process, in which the absorption and/or emission of microwave fields is related to a change of spin energy levels of the REE dopants upon irradiation with optical fields, and vice versa.

The telecommunications wavelength range is a wavelength range used for optical telecommunication. In particular, it relates to a wavelength range used for low-loss optical communications via optical fibers. The telecommunications wavelength range covers wavelengths in the near-infrared wavelength range between 1.25 µm and 1.65 µm, and in particular around 1.55 µm.

The exemplary embodiments provide the advantage that a photonic element for a quantum information processing device may be provided at a high quality and with reduced manufacturing effort than conventional devices. In particular, exemplary embodiments provide the advantage that a photonic element may be provided with conventional silicon-based semiconductor manufacturing techniques and, thus, may facilitate a large scale production of such photonic devices. This is achieved by integrating the REE dopants directly into a high-purity silicon layer and by refraining from implanting oxygen. Compared to conventional devices for quantum information processing, as described in WO 2021/030724 A1, no separate layer of a different material, such as a rare-earth oxide layer, is required as a host structure for the REE dopants. This allows a production of photonic elements according to exemplary embodiments by using conventional silicon semiconductor manufacturing techniques instead of requiring heterostructures including layers of different materials, which may not be compatible, or complicate, with silicon-based semiconductor manufacturing. Hence, conventional semiconductor manufacturing techniques and processes may be used for the production of high-quality photonic devices for quantum information processing devices paving the way for a cost-efficient production of quantum information processing devices. In other words, the exemplary embodiments allow providing a photonic element suitable for quantum information applications based on a REE dopants integrated directly into a silicon layer without the need of a heterostructure including the REE dopants in a separate non-silicon layer. For instance, optical spectroscopy and/or ion mass spectrometry may be used to ensure that the REE dopants are integrated directly into the high-purity silicon layer.

Moreover, the disclosure provides the advantage that a photonic device can be provided allowing a high level of resonant excitation of the integrated REE dopants instead of being limited to off-resonant excitation, as often observed in conventional prior-art devices. The resonant excitation may facilitate photonic quantum applications and may provide a more defined photonic device.

Conventional devices having REE dopants integrated in silicon exhibit a significant broadening of the linewidth of the optical transition between their crystal field levels, which may be desirable for many laser applications. However, this broadening of the linewidth reduces the coherence time of the emitted photons and, thus, is detrimental for quantum information processing applications, for which long coherence times are inevitably required. For this reason, it was commonly accepted in the art of quantum information processing that photonic elements having the REE dopants directly integrated into bulk silicon material are unsuitable for quantum information processing applications. However, the inventors have found that directly integrating REE dopants into a silicon layer of high purity and having a limited concentration of REE dopants in the high-purity silicon layer of $10^{19}$ cm$^{-3}$ or less provides optical transitions between the lowest crystal field levels of the REE dopants integrated in the high-purity silicon layer having a homogeneous linewidth of 10 MHz or less at a temperature of 4 K or less and, thus, allows providing a photonic element suitable for quantum information processing. Therefore, the exemplary embodiments provide devices for quantum information processing which may be manufactured using conventional techniques for silicon semiconductor device manufacturing and therefore reducing the manufacturing costs and enabling a silicon-based large-scale production of quantum information processing devices.

Thus, the disclosure provides the advantage that a photonic element can be provided having suitable properties for quantum information processing applications and having a facilitated layout without a need for hetero-structures. The required properties can be achieved by using a high-purity silicon layer with integrated REE dopants. Due to the high purity, REE dopants are integrated with a high yield in isolated lattice sites with reproducible properties. The yield may be considered as high when it exceeds 0.5%, i.e., that more than 0.5% of all integrated REE dopants are integrated at such isolated lattice sites. Optionally the yield may exceed 1%, optionally may exceed 5% and optionally may exceed 10%. This may not be achieved by conventional devices based on a high level of oxygen and/or other impurities being integrated together with the REE dopants.

In the photonic element, the concentration of REE dopants in the high-purity silicon layer may be at least by a factor of two higher than a concentration of oxygen in the high-purity silicon layer. This ensures a high purity of the high-purity silicon layer and allows achieving the specified spectral characteristics of the integrated REE dopants being integrated at isolated lattice sites with a high yield exceeding 0.5% optionally exceeding even >10%. Furthermore, the isolation of the REE dopants from the conduction band allows a resonant excitation in a narrow frequency range, which forms the basis for many quantum information processing applications. In particular, the emission characteristics, including the emission frequency, are not determined by an interaction of the REE dopants with surrounding oxygen atoms, as it is the case in may conventional devices, but are based on the high purity of the high-purity silicon layer and the associated integration of the REE dopants at isolated lattice sites with a high yield Likewise, the concentration of REE dopants in the high-purity silicon layer may be at least by a factor of two higher than a concentration of any other contaminants and/or defects in the high-purity silicon layer, such as Boron impurities. Moreover, the concentration of REE dopants in the high-purity silicon layer may be at least by a factor of three, optionally at least by a factor of five, and optionally at least by a factor of ten higher than a concentration of oxygen and/or any other contaminants and/or defects in the high-purity silicon layer. In general, the higher the purity of the high-purity silicon layer is, the larger the yield, i.e., the fraction of integrated REE dopants with favorable spectral and coherence characteristics of the photonics device will be.

In some exemplary embodiments, the REE dopants comprise or consist of erbium dopants. This provides the advantage that the emission spectrum or emission wavelength of the erbium dopants is in a wavelength range commonly used for optical telecommunication applications. Therefore, this allows integrating such a photonic element into or combining such a photonic element with existing optical telecommunication systems. Moreover, this provides the advantage that it allows using and exploiting techniques and systems known from conventional optical telecommunication technology for quantum information processes.

In some exemplary embodiments, the optical transition between the lowest crystal field levels of the erbium dopants has an emission wavelength in the optical telecommunications wavelength range and in particular in the range from 1.532 μm to 1.542 μm. This provides the advantage that an absorption of the emitted light by optical fibers and/or water and/or moisture is reduced compared to many other wavelength ranges.

In some exemplary embodiments, the high-purity silicon layer has an oxygen impurity concentration of $5 \cdot 10^{18}$ cm$^{-3}$ or less. This reduces the formation of erbium-oxygen clusters and, thus, may prevent a coupling of the erbium crystal field levels to the conduction band and/or the valence band (sometimes termed "optical activity" in the literature). While a high oxygen impurity concentration may be used and/or may be desired for conventional applications, such as lasing applications, some exemplary embodiments have an oxygen impurity concentration of $5 \cdot 10^{18}$ cm$^{-3}$ or even less, such as $1 \cdot 10^{18}$ cm$^{-3}$ or less, to avoid a coupling of the REE dopants to the conduction and valence band. According to this exemplary embodiment, a particularly small homogeneous linewidth can be achieved, i.e., the homogeneous broadening of the emission linewidth can be further reduced and the suitability for quantum information processing applications may be further improved.

In some exemplary embodiments, the integrated REE dopants are integrated at isolated lattice sites of the silicon crystal structure that lead to optical transitions out of the lower crystal field levels of the REE dopants at one or more of the following wavelengths: For one site at 1536.1 nm, 1553.5 nm, 1557.8 nm, 1573.4 nm, 1584.5 nm, 1593.6 nm; for another site at 1537.8 nm, 1558.8 nm, 1562.6 nm, 1581.7 nm, 1590.1 nm, and 1599.1 nm, each with an uncertainty of +/−0.5 nm. These lattice sites are such lattice sites, which are surrounded exclusively by silicon atoms. In other words, these lattice sites are such lattice sites which have a distance from possible other defects and/or contaminants being large enough such that the properties of the erbium dopant are not influenced by the defects and/or contaminants. The erbium dopants being located at such lattice sites may be confirmed by measuring the optical transitions between the crystal field levels of the erbium dopants. The optical transition wavelengths being at the above-mentioned wavelength values means that the lattice site of the respective erbium dopants satisfy the specified condition of being surrounded only by silicon atoms. These wavelengths apply to emissions of erbium dopants under a typical relative strain of $<10^{-4}$ in a silicon-on-insulator wafer (relative to the lattice constant of silicon) and cooled to cryogenic temperatures, i.e., to a temperature of 20 K or less. They may change when strain is applied to the crystal.

The optical transitions of the REE dopants depend on the lattice site, at which the individual REE dopant is integrated into the lattice. Though the REE dopants are identical erbium atoms, their optical transitions may vary due to the different occupied lattices sites. Thus, determining the respective emission wavelength(s) of the optical transition (s) allows determining whether the REE dopants are integrated at specific lattice sites of the silicon crystal structure of the high-purity silicon layer. The integration of the REE dopants in specific lattice sites is beneficial for achieving a high degree of coherence, i.e., a long coherence time, at a given temperature, or operating at a higher temperature at a given value of the required optical coherence. In addition or alternatively, the transition between the lowest crystal field levels exhibits an inhomogeneous linewidth of 10 GHz or less at a temperature of 20 K or less. In addition or alternatively, the optical transition between the lowest crystal field levels of the REE dopants integrated in the high-purity silicon layer may have a homogenous linewidth of 20 kHz or less at a temperature of 2 K or less. This narrow linewidth is more than a factor of 100 better than what has been achieved with conventional photonic elements (S. Chen, et al: Science 370, 592 (2020), L. Weiss et al.: Optica 8, 40 (2021)) and is achieved by the high yield of integration of the REE dopants at isolated lattice sites obtained in a high-purity and low-strain silicon layer.

In some exemplary embodiments, the REE dopants integrated in the high-purity silicon layer exhibit higher lying crystal field sub-levels having a separation from the respective lowest crystal field level of at least 1.5 THz in the ground state and of at least 1 THz in the first excited state at a temperature of 4 K or less. Also this feature originates in the erbium dopants being integrated at isolated lattice sites surrounded solely by silicon atoms, i.e., not being in the direct vicinity of other defects and/or contaminants, such as oxygen. Hence, also this separation of higher lying crystal field sub-levels from the respective lowest crystal field sub-levels allows a direct confirmation of the erbium dopants being integrated at isolated lattice sites. This pronounced spacing of 1.5 THz and 1 THz, respectively, between the sub-levels provides an energetic separation that is significantly higher than the thermal energy kT at cryogenic temperatures. For the REE dopants integrated at lattice sites corresponding to the above-mentioned wavelengths of the optical transitions, the criteria that the spacing between the sub-levels is significantly higher than the thermal energy kT is met at cryogenic temperatures. For comparison, a frequency splitting of 1 THz corresponds to an energy splitting which equals the thermal energy at a temperature of about 48 K. Therefore, populating higher-lying sub-levels can be avoided at temperatures significantly below 48 K by providing a frequency splitting of 1 THz or more. Accordingly, the large spacing of the sub-levels reduces the requirements regarding the cryogenic temperatures at which the photonic element has to be operated.

In some exemplary embodiments, the high-purity silicon layer has a homogeneous strain profile having a lattice constant fluctuation throughout the high-purity silicon layer of less than 0.5%. This increases the homogeneity and, thus, reduces the broadening of the linewidth of the optical transition of the REE dopants. The strain in the high-purity silicon layer may in particular correspond to a strain of $<10^{-4}$ typically observed in a silicon layer of a SOI wafer.

In some exemplary embodiments, the optical transition between the lowest crystal field levels of the REE dopants integrated in the high-purity silicon layer exhibits an electric dipole contribution, such that the radiative decay time of an optically excited state of the REE dopants, in particular of erbium dopants, is 0.9 ms or less. Optionally the radiative decay time of an optically excited state of the REE dopants may be less than 0.75 ms and optionally less than 0.3 ms. The dipole character may be beneficial for coupling the emitted light into a micro-resonator and/or a nano-resonator. Moreover, further reducing the lifetime of the excited state may be advantageous for some exemplary embodiments. Also this feature originates in the erbium dopants being integrated at isolated lattice sites, i.e., being surrounded solely by silicon atoms but being not in direct the vicinity of defects and/or contaminants, such as oxygen. This rapid decay time of an excited state of the REE dopant in general depends on the refractive index of the material surrounding the REE dopant. The higher the refractive index of the surrounding materials, the faster the decay time. Hence, having the REE dopant integrated at an isolated lattice site surrounded solely by silicon atoms provides a refractive index of about 3.5 (at a wavelength of 1.55 μm) in the surrounding of the REE dopant. In case oxygen contaminations would exist in the direct vicinity of the REE dopant, the surrounding material would comprise silicon-dioxide having a refractive index of only 1.4, which, thus, would result in a significantly increased decay time as compared to the isolated lattice site. Consequently, also the rapid decay time allows confirming the REE dopants being integrated at isolated lattice sites solely surrounded by silicon atoms.

The optical transition between the lowest crystal field levels of the REE dopants integrated in the high-purity silicon layer may have a homogenous linewidth of 50 kHz or less at a temperature of 4 K or less. Also this feature originates in the erbium dopants being integrated at isolated lattice sites, i.e., being surrounded solely by silicon atoms but not being in direct the vicinity of any defect and/or contaminant, such as oxygen. Consequently, the features described in this and the previous paragraphs originate in the REE dopants being integrated at isolated lattice sites, i.e., being surrounded solely by silicon atoms. These expressions of the integration of the REE dopants at the isolated lattice sites allow a precise confirmation of the integration of the REE dopants at the isolated lattice sites. This feature and the presented measurable expressions, i.e., transition wavelengths, decay times and linewidths, cannot be achieved by adding contaminants, such as oxygen, but can instead only be achieved by providing the specified purity to ensure that the REE dopants are solely surrounded by silicon atoms.

According to some exemplary embodiments it may be desired to have a long coherence time of the REE dopant in the ground state, for instance for storing quantum information in the respective REE dopant serving as a qubit.

In some exemplary embodiments, at least a part of the high-purity silicon layer containing the REE dopants is single-crystalline or polycrystalline with a grain size of at least 50 nm. This is beneficial for achieving a homogeneous crystal structure in the surrounding of individual REE dopants and, thus, to achieve small homogeneous and/or inhomogeneous broadening of the linewidth of the optical transition. Accordingly, this facilitates achieving long coherence times.

In some exemplary embodiments, a homogeneous strain profile of the crystalline high-purity silicon layer has a lattice constant fluctuation of less than 1% or even less than 0.1% at least in a part of the high-purity silicon layer comprising the integrated REE dopants. This contributes to a homogeneous surrounding of the REE dopants integrated into the high-purity silicon layer and, thus, reduces the homogeneous and/or inhomogeneous broadening of the linewidth of the optical transitions of the REE dopants.

In some exemplary embodiments, the high-purity silicon layer may be made of isotopically purified silicon and/or of silicon having a controlled isotopic composition. This may be achieved by using an epitaxial technique for growing the high-purity silicon layer using isotopically purified material. An isotopically pure high-purity silicon layer allows further increasing the homogeneity of the crystal structure and, thus, the surrounding of the lattice sites, in which the REE dopants are integrated, which may further reduce the inhomogeneous linewidth and improve the coherence. Moreover, controlling the isotopic composition of the silicon allows controlling the magnetic field in the high-purity silicon layer, for instance by choosing a silicon isotope having a non-zero nuclear spin or having a zero nuclear spin. In particular for devices and applications involving long coherence of the electronic or nuclear spins, the avoidance of magnetic fields in the surrounding silicon lattice by selecting isotopically purified silicon having no nuclear spin may be advantageous and increase the coherence time of the erbium spin state.

In some exemplary embodiments, the photonic element may comprise a seed layer formed of silicon, wherein the high-purity silicon layer is attached to the seed layer. This may facilitate the manufacturing of the high-purity silicon layer, since the high-purity silicon layer may for instance be epitaxially grown on the seed layer. The seed layer being made of silicon may assist an accurate growth and limiting a possible strain by providing a matching lattice parameter of the seed layer for the high-purity silicon layer.

In some exemplary embodiments, the photonic element may further comprise an insulating layer or several insulating layers having a low index of refraction, for instance of 2.4 or less, for optical radiation at a wavelength of 1.55 µm. The seed layer may be attached to the insulating layer. Alternatively or additionally the photonic element may comprise one or more further insulating layers, which for instance may be arranged on top of the photonic element, i.e., at the opposite side facing away from the seed layer. The insulating layer may be beneficial for achieving desired optical properties of the photonic element. For instance, the insulating layer may allow a total internal reflection of radiation propagating within the high-purity silicon layer and, thus, may allow forming a waveguide for guiding optical radiation through the high-purity silicon layer. Therefore, in some exemplary embodiments the photonic element forms an optical waveguide and wherein the optical waveguide is adapted to guide optical radiation within the high-purity silicon layer. The waveguide may be configured as one of the following types of waveguides: rib waveguide, ridge waveguide, photonic-crystal waveguide, and slow-light waveguide. The photonic element may optionally be suspended in vacuum and/or in helium gas.

In some exemplary embodiments, the insulating layer comprises or consists of $SiO_2$ and/or SiN. These materials offer refractive indices at wavelengths in the range of 1.55 µm which are particularly suitable for total internal reflection in combination with silicon and therefore may offer a suitable choice for the generation of an optical waveguide. Also, these layers may be used to create a specific strain in the high-purity layer that may be favorable for obtaining desired optical properties or spin properties of the embedded REE dopants.

The insulating layer and the seed layer may optionally form parts of a silicon-on-insulator wafer. This may facilitate the manufacturing of a photonic element, since the insulating layer and the seed layer may be prepared or provided as a standard component and be used as a substrate for the photonic element offering a predetermined functionality, such as insulating and/or optical properties, which may be desired for the resulting photonic element.

In some exemplary embodiments, the high-purity silicon layer may be attached to the seed layer by using an epitaxial technique, which may involve in particular at least one of the following techniques: chemical vapor deposition, physical vapor deposition, and molecular beam epitaxy. This allows a precise and well controlled growth of the high-purity silicon layer regarding its thickness and/or allows in particular to grow the high-purity silicon layer with a high purity and/or crystallinity. Moreover, this allows integrating the REE dopants into the high-purity silicon layer already during the growth of the high-purity silicon layer by additionally evaporating the desired REE dopants during the epitaxial growth of the high-purity silicon layer. In addition, this may allow precisely controlling the depth profile of the REE dopant distribution within the high-purity silicon layer.

In an additional exemplary embodiment, the high-purity silicon layer may be provided by thinning a bulk silicon crystal and/or a thin silicon slab attached to the seed layer or the insulating layer. This may offer a facilitated method of achieving a high-purity silicon layer having a high crystallinity. Alternatively or additionally, a seed layer may be provided by thinning a bulk silicon crystal. For instance, a seed layer and an insulating layer may be provided as a silicon-on-insulator (SOI) wafer, wherein the seed layer is provided by thinning a silicon slab to a desired thickness, for example 70 nm, and by growing the high-purity silicon onto the seed layer, for instance by chemical vapor deposition, for example with a thickness of about 120 nm. The seed layer may then facilitate the growth of a high-purity silicon layer with a high degree of crystallinity using an epitaxial technique. A silicon crystal of a particularly high purity may be chosen for this purpose, such as a float zone (FZ) silicon-on-insulator wafer. The high-purity silicon layer may, thus, be provided based on a silicon-on-insulator wafer, wherein the silicon part of the SOI wafer forming the high-purity silicon layer has a concentration of impurities of $1 \cdot 10^{17}$ cm$^{-3}$ or less and optionally of $1 \cdot 10^{16}$ cm$^{-3}$ or less. This may render an epitaxial step to achieve the high-purity silicon layer obsolete and, hence, facilitate the manufacturing process and/or reduce the manufacturing costs. The high-purity silicon layer may be provided by polishing the silicon-on-insulator wafer such that the high-purity silicon layer has a thickness of at least 10 nm and not more than 5 µm and optionally at least 150 nm and not more than 290 nm. The terms "polishing" and "thinning" are used as synonyms throughout this disclosure, although other techniques may be used for thinning a silicon layer.

The REE dopants may be integrated into the high-purity silicon layer at a concentration of $1 \cdot 10^{17}$ cm$^{-3}$ or more when devices based on ensembles or REEs are used. A concentration of $1 \cdot 10^{17}$ cm$^{-3}$ may already result in a suitable photonic device. This may allow an annealing of the device at about 600° C. without provoking an undesired clustering possible contaminants with the integrated REE dopants.

The REE dopants may be integrated into the high-purity silicon layer at an effective concentration of less than $10^{16}$ cm$^{-3}$, or even $10^{14}$ cm$^{-3}$ or less, which may be advantageous for manufacturing devices based on single REE emitters. Such low effective concentrations can optionally be achieved by using integrating a higher concentration of REE dopants in a first step, e.g., $1 \cdot 10^{17}$ cm$^{-3}$ or more, followed by annealing at 700° C., or even at higher temperatures. In this process, the concentration of REE dopants in the targeted site is reduced while increasing the concentration in off-resonant sites by clustering with other impurities or REE dopants.

The method may further comprise annealing the high-purity silicon layer at a temperature between 500° C. and 650° C. This may improve the crystalline quality of the high-purity silicon layer without having impurities clustering at the REE dopants or clustering of the REE dopants with one another, which would affect the spectral characteristics of the REE dopants.

Integrating the REE dopants in the high-purity silicon layer may comprise or consist of implanting the REE dopants into the high-purity silicon layer. This may facilitate the manufacturing effort as compared to evaporating the high-purity silicon layer together with the desired concentration of REE dopants.

The high-purity silicon layer may be provided with a thickness between 30 nm and 1 mm. The thickness may optionally be in a range from 100 nm to 2 µm. In some exemplary embodiments, in which the photonic element is adapted as a Fabry-Perot resonator the high-purity silicon layer may have thickness of several hundreds of micrometers.

In some exemplary embodiments the crystalline high-purity silicon layer may have a surface roughness of 1 nm RMS or less. This may improve the optical properties of the photonic element. In particular, it may ensure a high level of total internal reflection of radiation propagating through the high-purity silicon layer at its boundaries having the low surface roughness. The roughness may be measured by atomic force microscopy.

In some exemplary embodiments, the photonic element may be formed as a nanophotonic and/or nanoplasmonic device. For instance, the photonic element may be configured as or be a part of a resonator. Alternatively, it may be part of a nanophotonic and/or nanoplasmonic phase shifter, switch, frequency filter, and/or photodetector.

In some exemplary embodiments providing the high-purity silicon layer may comprise depositing the high-purity silicon layer onto a seed layer using an epitaxial technique, which may in particular involve at least one of the following techniques: chemical vapor deposition, physical vapor deposition and molecular beam epitaxy. The steps of depositing the high-purity silicon layer and integrating the REE dopants may be carried out at least partly simultaneously. During the steps of depositing the high-purity silicon layer and integrating the REE dopants the seed layer may at least partly be kept at a temperature between 300° C. and 650° C. This allows achieving a crystallinity of the high-purity silicon layer and integrating the REE dopants at lattice sites of the silicon crystal offering suitable properties for quantum information applications. The temperature between 300° C. and 650° C. during the deposition allows obtaining the above-determined suitable wavelengths and linewidths of the optical transitions of the REE dopants originating in the REE dopants being integrated at specific isolated lattice sites. In other words, keeping the seed layer at a temperature of 300° C. to 650° C. during at least a part of the process of depositing the high-purity silicon layer and integrating the REE dopants allows achieving a photonic element having the REE dopants integrated directly in the high-purity silicon layer and offering beneficial optical properties for quantum information applications, i.e., a long coherence time of the states of the REE dopants. In some cases, 500° C. may be a suitable temperature choice.

In some exemplary embodiments, the step of integrating the REE dopants is carried out at least partly after completion of the step of depositing the high-purity silicon layer. Integrating the REE dopants into the high-purity silicon layer after its deposition or other manufacturing process may include implanting the REE dopants into the high-purity silicon layer by ion implantation.

The high-purity silicon layer may be kept at a temperature between 300° C. and 650° C. during at least a part of the step of integrating the REE dopants into the high-purity silicon layer. This allows integrating the REE dopants at lattice sites of the silicon crystal offering suitable properties for quantum information applications. The temperature between 300° C. and 650° C. during the deposition therefore allows obtaining the above-determined suitable wavelengths and linewidths of the optical transitions of the REE dopants originating in the REE dopants being integrated at specific lattice sites. In other words, keeping the high-purity silicon layer at a temperature of 300° C. to 650° C. during at least a part of the process of implanting the REE dopants allows achieving a photonic element having the REE dopants integrated directly in the high-purity silicon layer and offering beneficial optical properties for quantum information applications, i.e., a long coherence time of the states of the REE dopants. Moreover, keeping the high-purity silicon layer at a temperature between 300° C. and 650° C. may further be beneficial for annealing the silicon crystal of the high-purity silicon layer and therefore to further improve the homogeneity of the high-purity silicon layer and the crystal structure surrounding the REE dopants. A suitable temperature choice may be the temperature being the lowest temperature at which the refractive index of the high-purity silicon layer changes by less than 3%. In some cases, 500° C. may be a suitable temperature choice.

According to an exemplary embodiment, integrating the REE dopants into the high-purity silicon layer may comprise at least one implantation step and at least one annealing step, wherein during the annealing step the high-purity silicon layer is kept at a temperature between 300° C. and 650° C. During the implantation step the high-purity silicon layer may be kept at a different temperature, for instance at a lower temperature and for instance at room temperature. Accordingly, the annealing step and the implantation step may be separated from each other. This may provide the advantage that possible crystal defects possibly originating from the implantation step may be healed during the annealing step after the previous implantation step is completed. In some exemplary embodiments the high-purity silicon layer may be heated locally, e.g., with a laser focused to a small spot of the high-purity silicon layer. By doing so, different parts of the chip can be annealed at different temperatures, which may be beneficial for some devices (such as classical electronics co-integrated on the chip).

Integrating the REE dopants into the high-purity silicon layer may comprise one annealing and two deposition steps or two annealing steps and one deposition step. Integrating the REE dopants into the high-purity silicon layer may alternatively comprise multiple implantation steps and multiple annealing steps in an alternating order. This may improve the implantation result while reducing the crystal defects and, thus, result in a photonic element having further improved properties for quantum information applications. The temperature during a deposition step and/or annealing step may be selected based on an implantation dose and/or based on an implantation energy.

In some exemplary embodiments, the implantation of REE dopants into the high-purity silicon layer may be carried out in a spatially selective manner A spatial selection of the implantation may be based on applying a mask during the implantation process. This increases the flexibility of designing and manufacturing photonic elements having specific properties for specific purposes. In some exemplary embodiments the REE dopants may be integrated into the high-purity silicon layer such that individual REE dopants and/or clusters of REE dopants have a distance from each other being equal or close to $\lambda/2$ or an integer multiple of $\lambda/2$, wherein $\lambda$ indicates the emission wavelength of the REE dopants in the photonic element. For the case that several REE dopants exhibit different emission wavelengths, $\lambda$ may correspond to an average or an approximation of these wavelengths. The distancing of the REE dopants and/or clusters of REE dopants may be applied within a plane of the high-purity silicon layer and/or perpendicular or any other non-zero angle regarding the plane of the high-purity silicon layer, i.e., along the thickness of the high-purity silicon layer. Individual REE dopants and/or clusters of REE dopants being arranged at a distance of $\lambda/2$ or an integer multiple of $\lambda/2$ from each other may allow the REE dopants to collectively emit and/or absorb light via superradiance and superabsorption, respectively. This may enhance the efficiency of the involved light-matter-interaction without the need for an optical resonator.

In some exemplary embodiments, providing the high-purity silicon layer may comprise providing multiple sub-layers of the high-purity silicon layer. Alternatively or additionally integrating the REE dopants into the high-purity silicon layer may comprise multiple implantation steps, wherein the steps of providing sub-layers of the high-purity silicon layer and the implantation steps are optionally arranged in an alternating order. This may allow achieving a precise and predetermined distribution of the REE dopants with regard to the high-purity silicon layer and/or its multiple sub-layers. In addition, it may allow implantation with reduced energy that may reduce crystalline damage and thus further improve the optical and coherence properties of the REE dopants.

In some exemplary embodiments, the photonic element and/or the REE doped high-purity silicon layer may be arranged between electrodes suitable for applying electric and/or microwave fields. This may allow varying and/or controlling an emission wavelength of the REE dopants via the Zeeman or the Stark effect in order to tune them in resonance with one another and/or with a resonator, a filter, and/or another element whose function may depend on the emission wavelength. In addition, electric and magnetic fields may drive transitions between electronic and/or nuclear spin states of the REE dopants, e.g., to implement single-qubit rotations and/or quantum gates and/or qubit readout.

In some exemplary embodiments, an external magnetic field may be provided to split the electronic spin levels and/or nuclear spin levels of the REE dopants. The magnetic field may have a field strength of 200 mT or less. This may allow having different energy levels associated with different spin states and, thus, addressing and/or exciting the individual spin states by selecting the excitation wavelength accordingly.

Alternatively a magnetic field having a field strength of 1 T or more may be applied. The magnetic field may vary depending on the temperature. For higher temperatures higher magnetic fields may be applied. Applying a magnetic field of 1 T or more may allow "freezing" the electronic spin state of the REE dopants in the respective spin state having a lower energy. Applying a magnetic field of 1 T or more results in a large energy splitting of the spin states, wherein the energy splitting is larger than the thermal energy kT at cryogenic temperatures, such as for example 4 K or below. Therefore, the thermal energy is insufficient to populate the electronic state having higher energy levels and, thus, the spin state remains "frozen", i.e., trapped, in the lowest spin and orbital state. By "freezing" the electronic spin state in the lowest energetic state, a long coherence time of the nuclear spin of the REE dopant, for instance an $^{167}$Er dopant, can be achieved since an interference with the electronic spin of the respective REE dopant can be reduced or avoided. Hence, such exemplary embodiments may be advantageous for devices and applications based on and/or involving the nuclear spin of the REE dopants.

In some exemplary embodiments, the photonic element may, thus, be provided in an external magnetic field and/or may be provided with a source for a magnetic field for providing a magnetic field having a typical field strength of 200 mT, or less when using the electronic spin, or 200 mT or more and even 1 T or more when using the nuclear spin to encode quantum information.

In some exemplary embodiments, the signal converter may be configured to transfer quantum coherence from an optical photon to a microwave photon and/or vice versa. This may be achieved by electro-optical coupling of the optical photon and the microwave photon in a signal converter.

It is understood by a person skilled in the art that the above-described features and the features in the following description and drawings are not only disclosed in the explicitly disclosed exemplary embodiments and combinations, but that also other technically feasible combinations as well as the isolated features are comprised by the disclosure. In the following, several exemplary embodiments and specific examples are described with reference to the drawings without limiting the disclosure to the described exemplary embodiments.

DESCRIPTION OF EXEMPLARY EMBODIMENTS

Figure 1A:
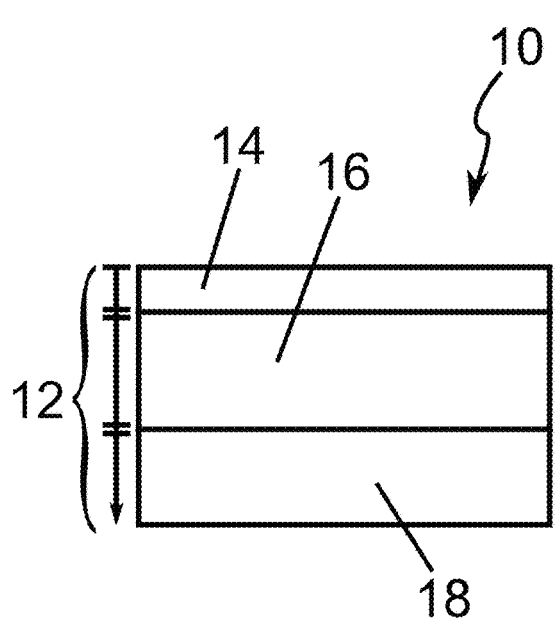
FIGS. 1A to 1D schematically illustrate a method for producing a photonic element for a quantum information processing device according to an exemplary embodiment.

In the drawings the same reference numerals are used for corresponding or similar features in different drawings.

With reference to FIGS. 1A to 1D a method for producing a photonic element 10 for a quantum information processing device according to an exemplary embodiment will be schematically illustrated.

The method comprises providing a high-purity silicon layer. As a basis, a silicon-on-insulator (SOI) wafer 12 is used comprising a seed layer 14 made of a thin layer of Cz-grown silicon bonded to an insulating layer 16 having a lower refractive index than silicon, which is made of $SiO_2$. The insulating layer 16 may be supported by a silicon wafer 18. According to an exemplary embodiment, the seed layer 14, the insulating layer 16 and the silicon wafer 18 may be provided as a single SOI wafer. However, according to other exemplary embodiments, these layers may be separately applied to a suitable basis, such as a silicon wafer or any other suitable basis. The layers are merely shown in a schematic manner, wherein their relative thicknesses may be shown in an exaggerated manner.

In the exemplarily shown exemplary embodiment, the silicon wafer 18 may have a thickness of about 700 μm, the insulating layer 16 may have a thickness of about 2 μm and the seed layer 14 may have a thickness of about 70 nm.

Figure 1B:
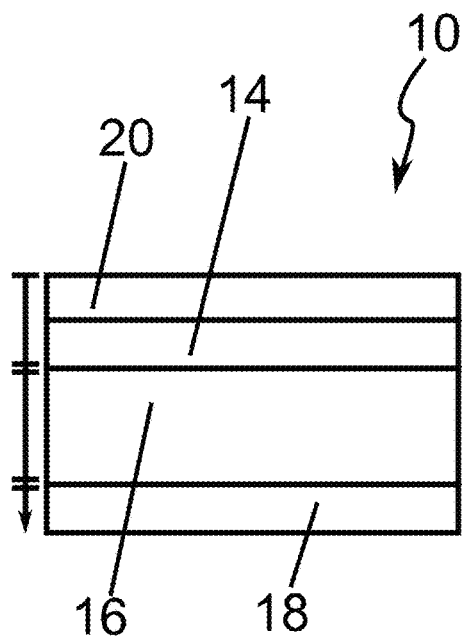

As shown in FIG. 1B, the seed layer 14 serves as a substrate for providing the intended high-purity silicon layer 20. The high-purity silicon layer 20 is provided on top of the seed layer 14 using an epitaxial technique. According to the illustrated exemplary embodiment, the high-purity silicon layer 20 may be deposited by chemical vapor deposition (CVD). In other exemplary embodiments, a different epitaxial technique may be used and may result in a comparable layer. The seed layer 14 serves as a suitable substrate for the deposited high-purity silicon layer 20, since it offers a suitable lattice parameter. The lattice parameter and consequently the strain in the high-purity silicon layer may optionally be predetermined and varied by providing the seed layer with a desired strain. The total thickness of the high-purity silicon layer 20 and the seed layer 14 is about 0.2 μm according to the illustrated exemplary embodiment.

Depositing the high-purity silicon layer 20 offers the advantages that a concentration of crystal defects and impurities, in particular oxygen, can be achieved as low as $5 \cdot 10^{18}$ $cm^{-3}$ or less for each impurity or even lower than $1 \cdot 10^{18}$ $cm^{-3}$. Moreover, it offers the option of growing the high-purity silicon layer from isotopically purified silicon, which may enhance the coherence time of electronic and/or nuclear spins of dopants and/or reduce spectral diffusion of a transition frequency of REE dopants integrated into the high-purity silicon layer 20.

Figure 1C:
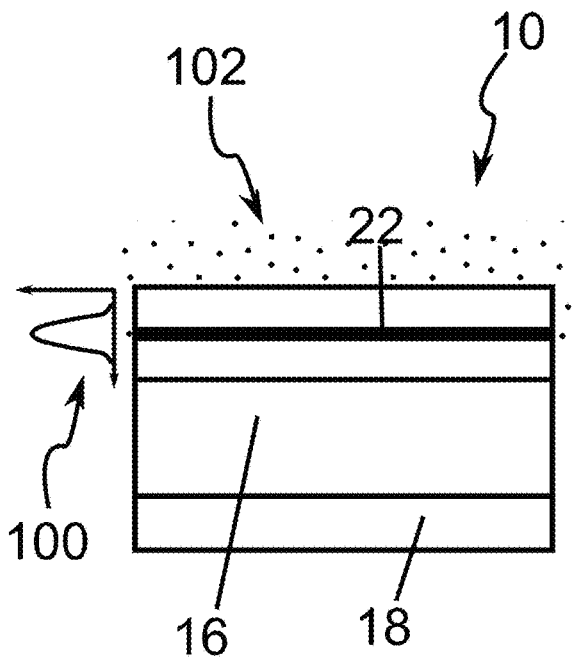

In a next step illustrated in FIG. 1C, REE dopants 22 are integrated into the high-purity silicon layer 20, such that the high-purity silicon layer 20 comprises integrated REE 22 dopants at a concentration of $1 \cdot 10^{19}$ $cm^{-3}$ or less, such as $1 \cdot 10^{17}$ $cm^{-3}$. This limited concentration reduces clustering of the REE dopants 22 and the individual REE dopants 22 influencing each other in a detrimental manner. The REE dopants 22 may be integrated according to a predetermined depth profile, which is exemplarily indicated by the schematic graph 100 on the left-hand side of the FIG. 1C. Needless to say, that also other depth profiles are possible for integrating the REE dopants 22.

According to the exemplarily shown exemplary embodiment, the REE dopants 22 are integrated into the high-purity silicon layer 20 by implantation of the REE dopants 22 after growing the high-purity silicon layer 20 is completed. The implantation process is indicated by the "cloud" of REE dopants 102. The implantation may be carried out in one or several implantation steps.

According to the depicted exemplary embodiment, the high-purity silicon layer is kept at a temperature of about 500° C. during the implantation of the REE dopants. The implantation is carried out at a sample angle of 7° in two implantation steps, wherein one implantation step is carried out with a dose of $4.5 \cdot 10^{11}$ erbium ions per $cm^2$ at an energy of 100 keV and another implantation step is carried out with a dose of $1 \cdot 10^{12}$ erbium ions per $cm^2$ at an energy of 350 keV. The chosen REE dopant is the $^{170}Er$ isotope of erbium having no nuclear spin. In other exemplary embodiments the isotope $^{167}Er$ having a nuclear spin may be chosen. According to yet other exemplary embodiments, other isotopes and mixtures thereof may be chosen.

In some exemplary embodiments, the implantation temperature may be larger than 300° C., such that implantation damage is removed by annealing already during the implantation process, and smaller than 650° C. to avoid REE dopant segregation during the implantation. A temperature offering a good compromise may depend on the dose and implantation energy. It may be determined by measuring the refractive index of the high-purity silicon layer before and after implantation. A suitable temperature choice may be the temperature being the lowest temperature at which the refractive index of the high-purity silicon layer changes by less than 3%.

The implantation resulted in a homogeneous concentration of erbium dopants in a depth profile between 50 nm and 150 nm of the high-purity silicon layer. The photonic device exhibited a narrow homogeneous broadening of the optical emission of the erbium dopants.

For the sake of completeness it is mentioned that the same parameters (except the doses) were successfully used at a ten-times larger doses at the implantation steps, which due to the higher concentration lead to a larger inhomogeneous broadening of the optical emissions due to the higher concentration of REE dopants.

Implanting the REE dopants may offer the advantage of maintaining a high crystal quality of the high-purity silicon layer. A further advantage of using an implantation technique, such as ion implantation, may be its compatibility with CMOS-fabrication techniques and that a spatially selective implantation can be achieved, for instance by using masks for avoiding an integration of REE dopants at undesired parts of the high-purity silicon layer. Another advantage of the implantation process is that mass filters may be used to directly choose the implanted erbium isotope depending on the desired spin properties.

According to other exemplary embodiments, REE dopants 22 may additionally or alternatively be integrated during the epitaxial growth process.

Therefore, with completing the step illustrated in FIG. 1C, a photonic element 10 comprising a high-purity silicon layer having integrated REE dopants, such as erbium dopants, is provided.

Figure 1D:
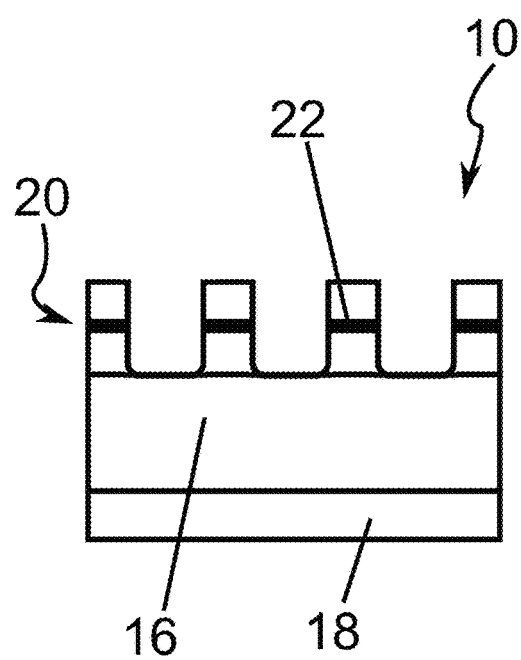

In an additional further step, as illustrated in FIG. 1D, one or more steps for conventional nanofabricating may be applied to the photonic element. The nanofabrication may be directed towards configuring the photonic element as a waveguide and/or a resonator and/or any other quantum information processing device.

The photonic device may then be used for instance as a waveguide for guiding optical radiation within the high-purity silicon layer and optionally the seed layer. The waveguide may be based on total internal reflection, which is achieved by the insulating layer 16, forming the boundary to the seed layer 14, having a lower refractive index than the seed layer 14 and the high-purity silicon layer 20, which prevents light from propagating from the seed layer 14 and the high-purity silicon layer 20 into the insulating layer 16 in large range of propagation angles. Likewise, the upper surface of the high-purity silicon layer 20 may be in contact with air, vacuum, dilute helium at a pressure of few millibar, or other gases, which also have a lower refractive index than the high-purity silicon layer 20 and support the total internal reflection. In other exemplary embodiments, a low-refractive index material having a lower refractive index than silicon, such as silicon dioxide, may be applied at the upper surface of the high-purity silicon layer 20 to support the total internal reflection of optical radiation within the high-purity silicon layer 20.

Figure 2A:
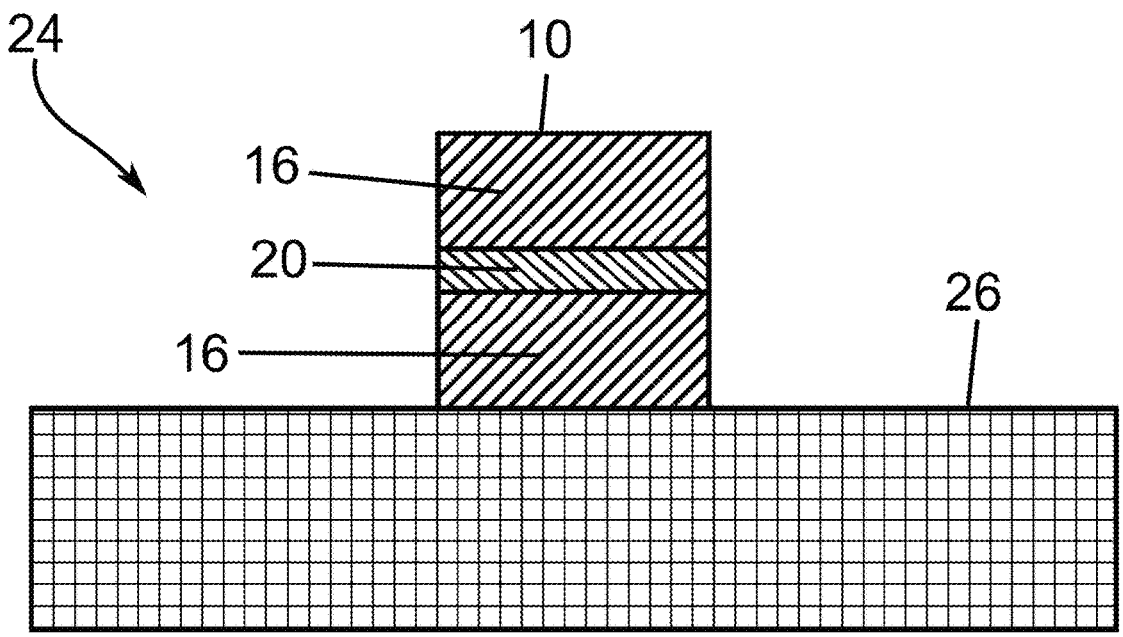
FIGS. 2A and 2B schematically illustrate waveguides according to exemplary embodiments.
Figure 2B:
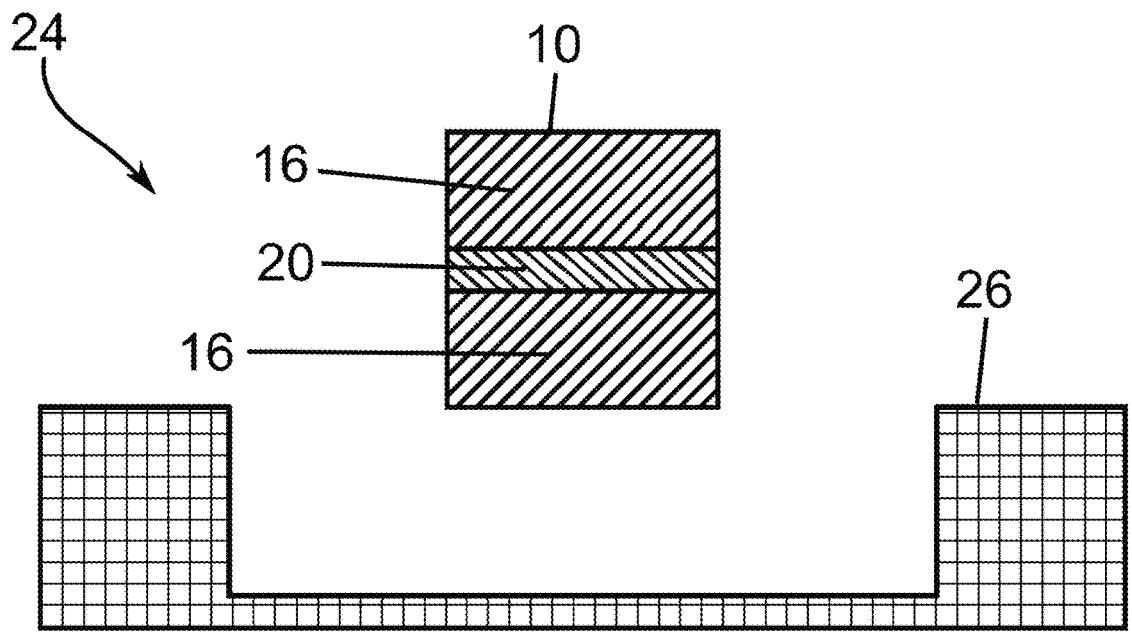

FIG. 2A schematically illustrates a waveguide 24 according to an exemplary embodiment. The waveguide 24 comprises a photonic element 10 according to an exemplary embodiment, which is arranged on a supporting substrate 26. The high-purity silicon layer 20 of the photonic element 10 includes REE dopants (not shown) and is configured to guide optical light waves coupled into the high-purity silicon layer 20. In at least two directions, i.e., at the upper and lower side according to the illustration in FIG. 2A, the high-purity silicon layer is confined by insulating layers 16 having a lower refractive index than silicon and, thus, enhancing total internal reflection of optical light waves guided in the high-purity silicon layer 20. The insulating layers may for instance be made of air, dilute helium at a pressure of few millibar, or other gases, $SiO_2$ or any other electrically insulating material having a lower refractive index than silicon. The insulating layers 16 do not necessarily have to be made of the same material. According to an exemplary embodiment, the supporting substrate 26 and the lower insulating layer 16 and an optional seed layer on which the high-purity silicon layer 20 is attached (not shown) may be part of or may be provided as a SOI wafer. FIG. 2B depicts a waveguide corresponding in most aspects to the waveguide shown in FIG. 2A but differing in the fact that at least a part of the supporting substrate 26 is removed at some parts underneath the photonic element 10.

Figure 3A:
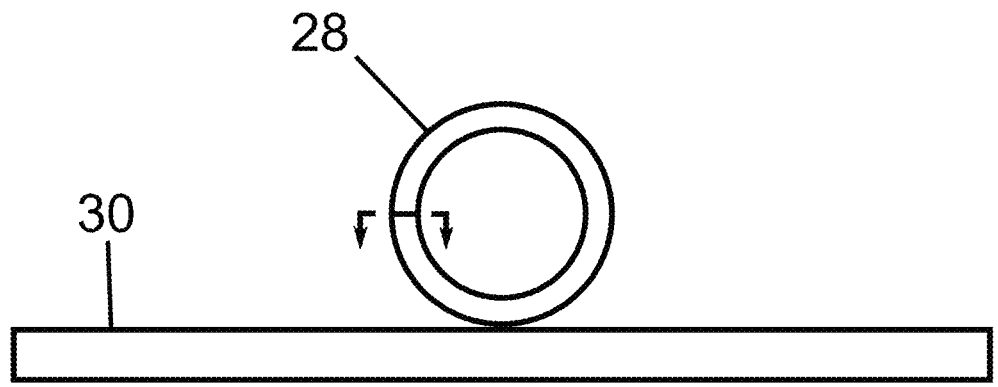
FIGS. 3A and 3B schematically depict a micro-resonator according to an exemplary embodiment.
Figure 3B:
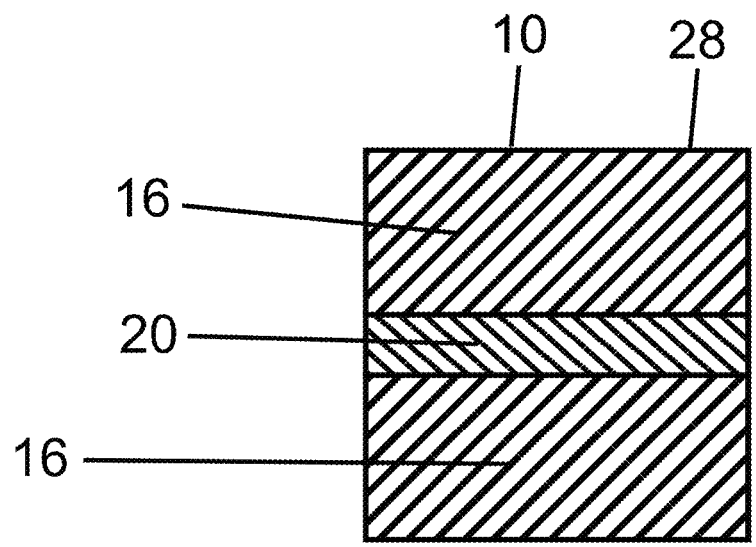

FIGS. 3A and 3B schematically depict a micro-resonator 28 according to an exemplary embodiment in a top-down view (FIG. 3A) and in a cross-sectional view (FIG. 3B). According to the presented exemplary embodiment, the micro-resonator 28 is configured as a ring resonator. In other exemplary embodiments, the micro-resonator may have different shapes, such as for instance elliptical or race-track shape etc. The diameter of the micro-resonator 28 may for instance be 100 µm or less. Moreover, the micro-resonator 28 may be attached to or comprise a coupling waveguide 30 for coupling optical radiation into and out from the micro-resonator. As can be seen in FIG. 3B, the micro-resonator may comprise a photonic element having the high-purity silicon layer 20 including the REE dopants sandwiched between two insulating layers 16 having a lower refractive index than silicon to form a waveguide. According to some exemplary embodiments, the photonic element 10 may be confined on all sides by a material having a lower refractive index than silicon and the wavelength of intended use of the micro-resonator 28. The micro-resonator may be used to confine an optical light wave, such as a photon, and by confining the photons providing an enhanced electric field strength within the waveguide of the micro-resonator to enhance a coupling of the photon or optical light wave with at least a part of the REE dopants integrated into the high-purity silicon layer 20.

Figure 4:
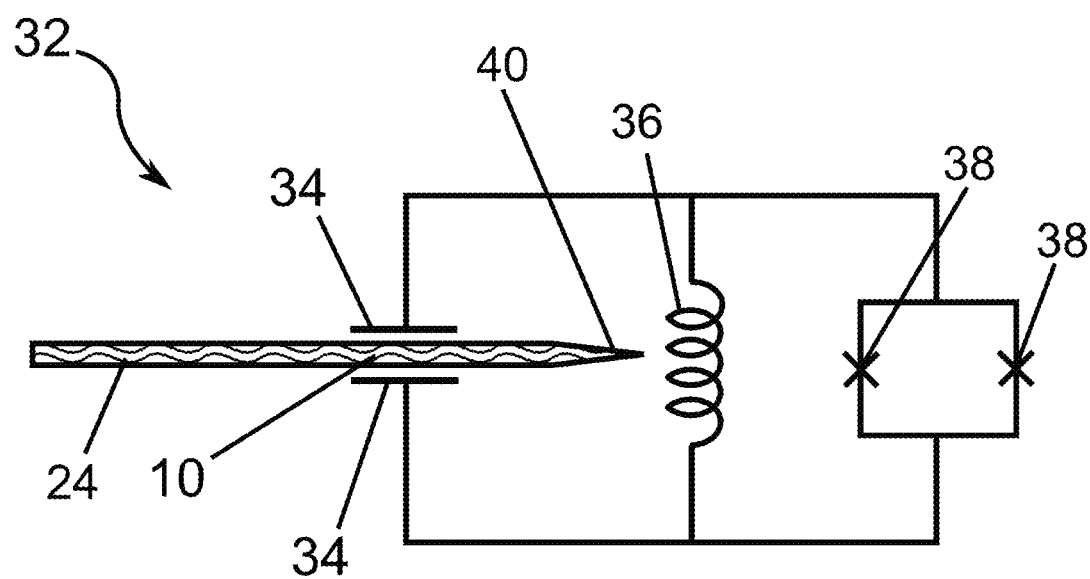
FIG. 4 schematically illustrates a signal converter for quantum information processing devices according to an exemplary embodiment.

FIG. 4 schematically illustrates a signal converter 32 for quantum information processing devices according to an exemplary embodiment. The signal converter 32 may be configured to transferring quantum coherence from an optical photon to a microwave photon. The signal converter 32 comprises a capacitor formed from two electrodes 34 with a photonic element 10 according to an exemplary embodiment arranged between them. A light field, for instance a single photon, impinges the signal converter 32 from a waveguide 24 attached to its left side. The photon is coupled to the spin of the REE dopants in the waveguide 24, which is in turn coupled to an electromagnetic field in an electrical part of the signal converter that may contain a capacitor having two or more electrodes 34, an inductance or a coil 36 and a superconducting qubit made e.g., from nonlinear inductances 38. The electromagnetic field in the electrical part of the signal converter may be at radio- or microwave frequencies. Thus, the REE dopant(s) may be coupled to both the optical and electromagnetic field in the signal converter 32, which allows to transfer quantum states from one part to the other. The tip 40 of the waveguide 24 is used for coupling photons from the waveguide 24 to a propagating mode, such as a mode of an optical fiber.

Figure 5:
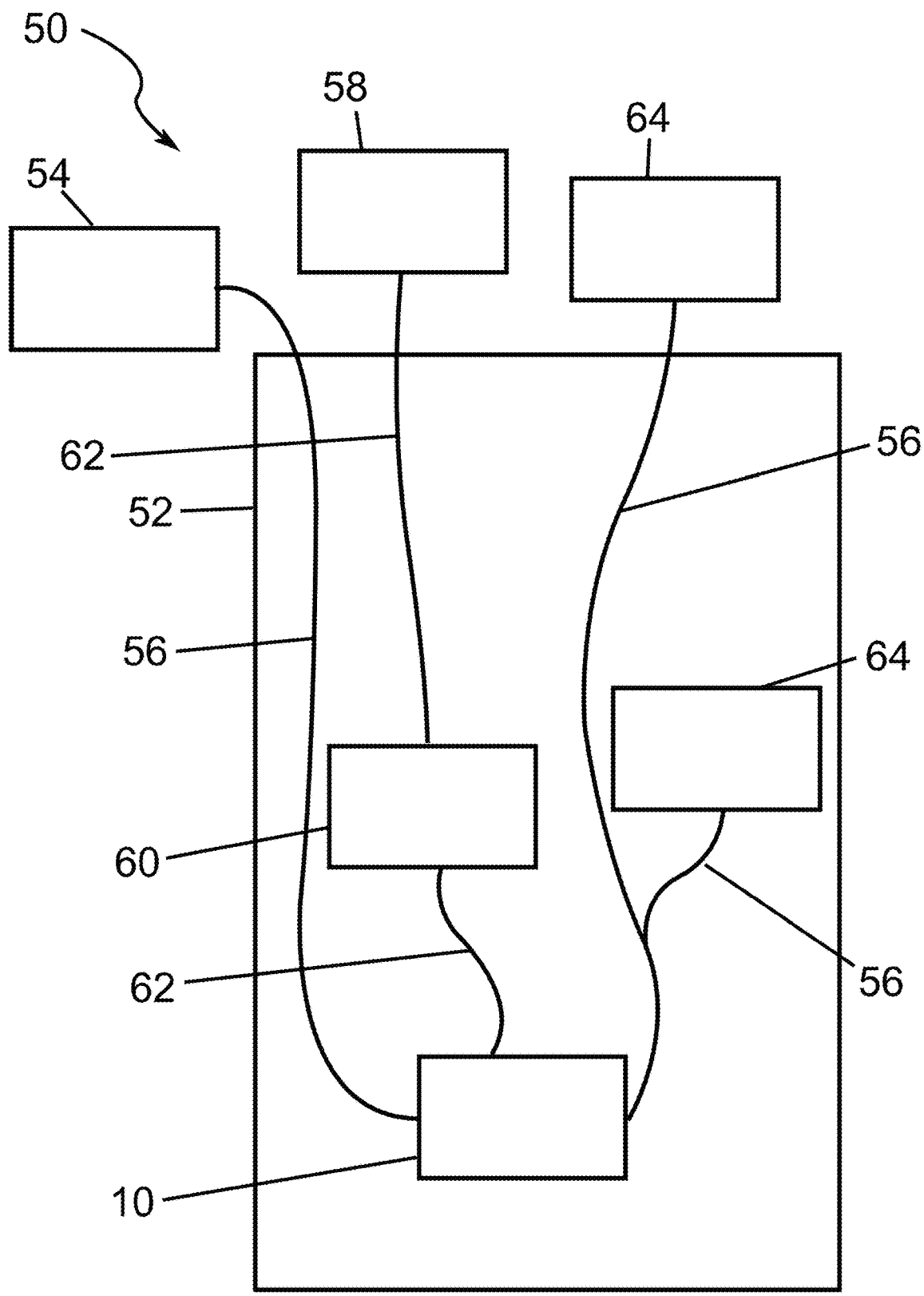
FIG. 5 schematically illustrates a quantum information processing device according to an exemplary embodiment.

FIG. 5 schematically illustrates a quantum information processing device 50 according to an exemplary embodiment. The quantum information processing device 50 comprises a photonic element 10 according to an exemplary embodiment arranged in a refrigerator 52, such as a cryogenic device.

The photonic element 10 may have optical inputs 54 coupled to it, such as lasers, LEDs, single photons, etc. In some exemplary embodiments, the optical inputs 54 may include more than one optical signal at a time, such as two or many laser waves at different frequencies, or one laser wave and a single photon etc. The optical inputs 54 may be coupled to the photonic element through an optical connector 56, such as one or more optical fibers. The photonic system may, in some exemplary embodiments, be electronically controlled by an outer control box 58, which may send, receive, amplify, filter, attenuate and/or otherwise control various signals to and from an inner control box 60 through one or more electrical connectors 62, such as one or more coaxial cables. The inner control box 60 may send, receive, amplify, filter, attenuate and/or otherwise control various signals to and from the outer control box 58 and the photonic element 10 through one or more electrical connectors 62, such as one or more coaxial cables. In some exemplary embodiments, the photonic element 10 may include a magnet such as a superconducting magnet that can apply a controllable magnetic field, which may shift energy levels of the photonic element 10, such as through the Zeeman effect. The magnet may apply a magnetic field of any suitable strength, such as in the range of zero to one tesla or higher than one tesla.

The photonic element 10 may also be connected to photodetectors 64 inside the refrigerator 52 and/or photodetectors 64 outside the refrigerator 52. In the illustrative exemplary embodiment, the photodetectors 64 inside the refrigerator 52 may be superconducting nanowire single-photon detectors (SNSPDs). Additionally or alternatively, in some exemplary embodiments, the photodetectors 64 may be any other kind of photodetectors, such as photodiodes, avalanche photodiodes, homodyne detectors, and/or heterodyne detectors, etc. The photonic element 10 may be connected to the photodetectors 64 through one or more optical connectors 56, such as fiber optic cables. Each of the photodetectors 64 may be connected to other equipment or electronics, such as the control boxes 58, 60 through one or more electrical connectors, such as coaxial cables (not shown).

The illustrative refrigerator 52 may be a dilution refrigerator capable of cooling a sample to a temperature of approximately 10 mK. In other exemplary embodiments, the refrigerator 52 may be any other suitable type of refrigerator, such as a magnetic refrigerator, and may be capable of cooling a sample such as some or all of the photonic element 10 to a different temperature, such as 77 K, 4 K, 1 K, or 100 mK. The illustrative inner control box 60 is inside the refrigerator 52, cooled down to a low temperature such as 1 K. It should be appreciated that, in some exemplary embodiments, the system may include more than one inner control box 60 and/or various other electrical elements not shown, which may be at various temperatures such as 4 K, 1 K, 100 mK, or 20 mK. The illustrative outer control box 58 is outside the refrigerator 52 and is at room temperature. It should be appreciated that the system may include additional optical and/or electronic equipment in some exemplary embodiments, such as logic electronics, wave-shaping electronics, optoelectronics, optical modulators, etc.

In some exemplary embodiments the photonic element 10 may include a resonator. The outer control box 58 and/or the inner control box 60 may be further adapted to allow tuning a frequency of the resonator, e.g., by providing an electric signal to a Piezo actuator, changing the refractive index of an element within the resonator, and/or by freezing gas to the outer surface of the resonator.

Figure 6A:
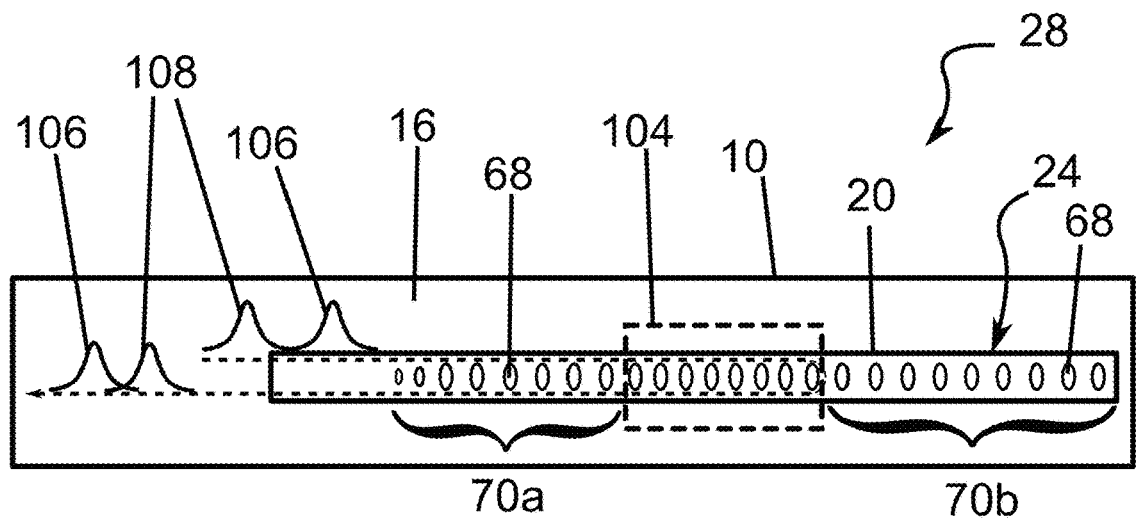
FIGS. 6A and 6B schematically depict a micro-resonator according to an exemplary embodiment.
Figure 6B:
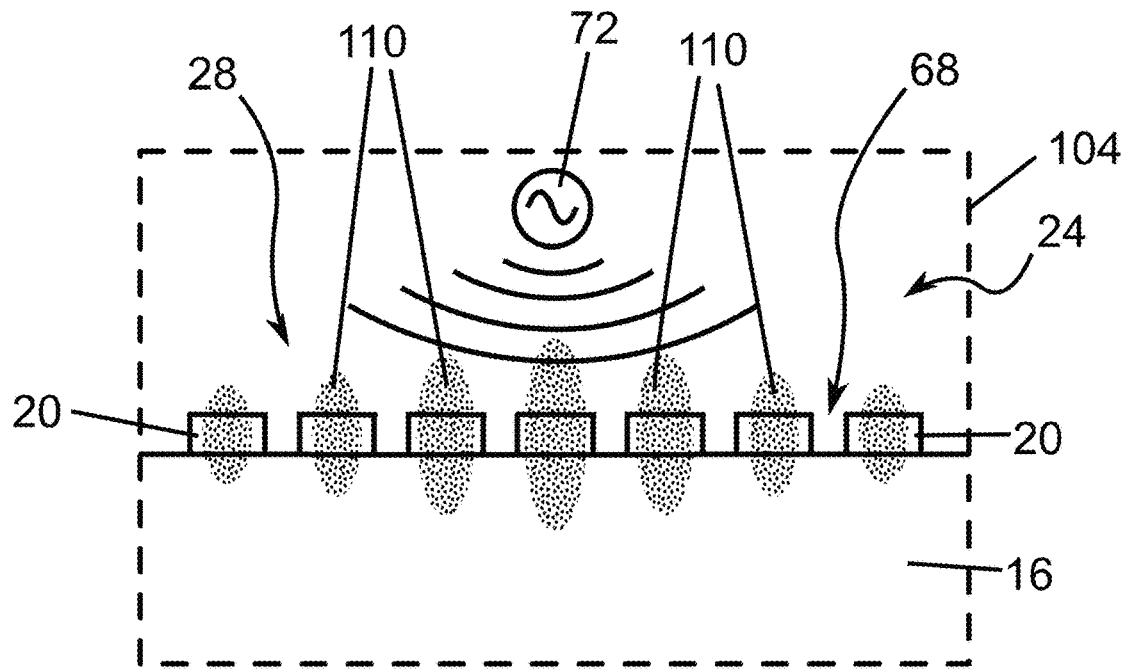

FIGS. 6A and 6B schematically depict a micro-resonator 28 according to an exemplary embodiment comprising a photonic element 10 for quantum information processing according to an exemplary embodiment. FIG. 6A shows the micro-resonator 28 in a top-view. FIG. 6B shows a central section 104 of the micro-resonator 28 in a side-view indicated in FIG. 6A by a dashed line.

The micro-resonator 28 comprises the photonic element 10 which is adapted as a photonic waveguide 24, wherein the photonic waveguide 24 is formed by a high-purity silicon-layer 20 doped with REE dopants. The high-purity silicon layer may be supported by an insulating layer 16. The dimensions of the waveguide are chosen such that incoupled light pulses 106, 108 are spatially confined in two dimensions by the waveguide 24. The waveguide 24 is configured such that the light pulses coupled into the waveguide 24 are confined in two dimensions within the REE doped high-purity silicon layer 20. A further confinement along the propagation direction of the light pulses 106, 108 such as to form a resonator cavity is provided by a microstructure applied to the high-purity silicon layer 20, according to which the high-purity silicon layer 20 comprises holes 68 forming two opposing Bragg reflectors 70a, 70b within the high-purity silicon layer 20. Instead of holes, the respective areas may be formed of a material having a lower refractive index than the surrounding high-purity silicon layer 20. The Bragg reflectors 70a, 70b are configured such that the light pulses 106,108 coupled into the waveguide 24 are confined in a resonator cavity arranged in the central region indicated by the dashed line 104. One of the Bragg reflectors, i.e., Bragg grating 70a, may exhibit a reduced reflectivity to allow an efficient coupling of light pulses into and out of the resonator cavity 104. The opposing Bragg reflector 70b may have a reflectivity of 100% or close to 100% in order to achieve a micro-resonator 28 having a high quality.

Due to the holes 68 forming the Bragg reflectors 70a, 70b, the high-purity silicon layer 20 appears in the cross-sectional side-view (FIG. 6B) as an alternating arrangement of high-purity silicon layer segments and holes 68. The resonant light pulses 106, 108 coupled into the micro-resonator 28 are confined in the central area of the wave guide forming a standing optical wave having local maxima of the electric field in the region of the high-purity silicon layer segments, as indicated by the symbolic electric field distribution 110. Thus, even for light pulses having a low pulse energy and even for single photons, a considerable electric field strength and intensity can be achieved within the high-purity silicon layer segments allowing an efficient coupling between the photon(s) and the REE dopants.

Light pulses 106, 108 of different frequencies may be coupled into the waveguide 24 and interact with respective REE dopants having an absorption cross section matching the frequency of the respective light pulses 106, 108. The respective frequency may depend on particular quantum states of the respective REE dopants, such as their electronic spin, and their surroundings. A magnetic field may be applied to split the energy levels of different spin states. Moreover, microwave radiation may be applied, as indicated by microwave generator 72, to control the spin state of some or all of the REE dopants. After exchanging quantum information between the photon(s) coupled into the waveguide 24 and the REE dopant(s), the photon(s), i.e., the light pulses, may be coupled out of the micro-resonator, as indicated by the symbolic pulses.

Figure 7:
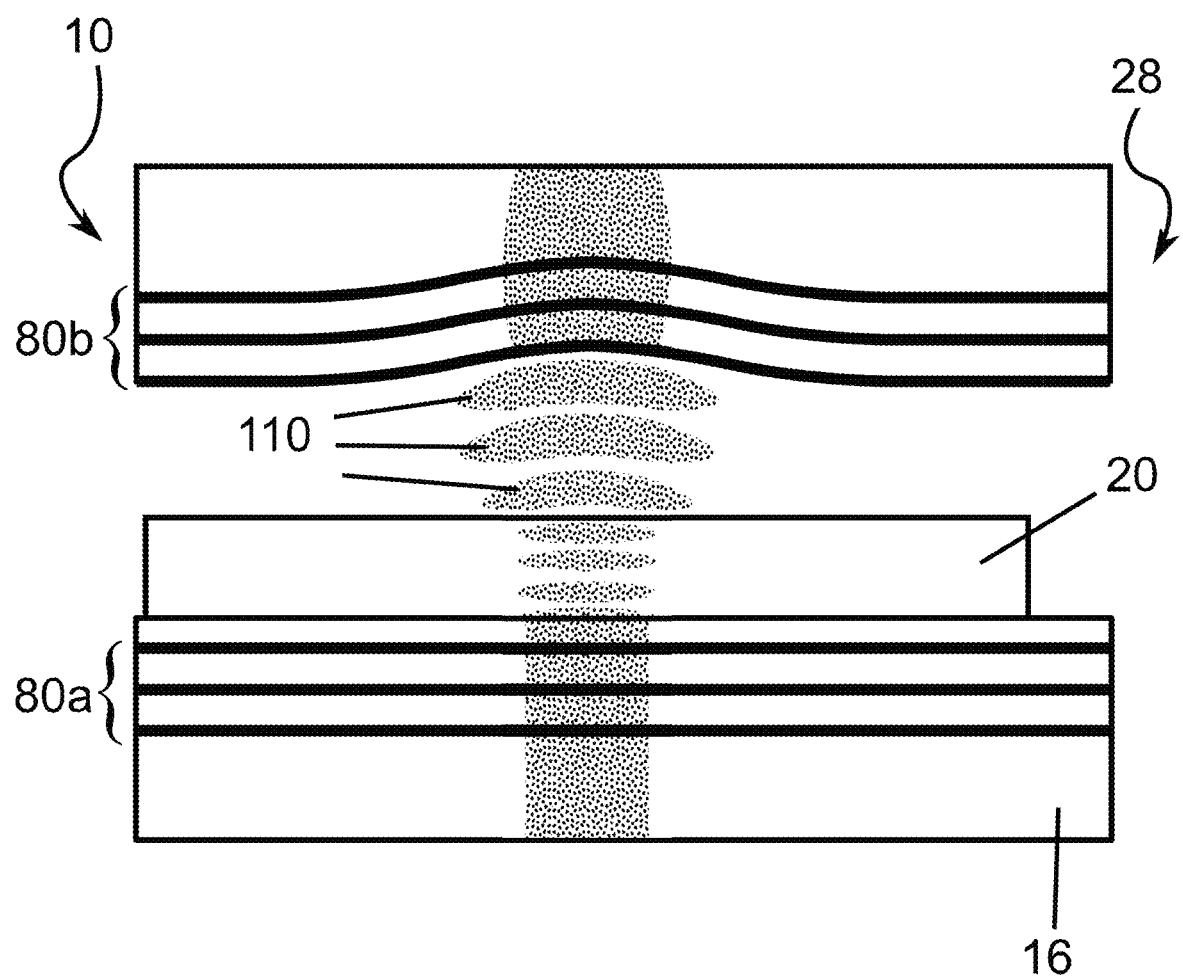
FIG. 7 schematically depicts a micro-resonator according to another exemplary embodiment.

FIG. 7 depicts a micro-resonator 28 according to yet another exemplary embodiment which is configured as a Fabry-Perot resonator. The micro-resonator 28 comprises a photonic element 10 having a high-purity silicon layer 20 arranged between two dielectric multilayer reflectors 80a and 80b. The high-purity silicon layer has integrated REE dopants and is supported by an insulating layer 16, wherein one of the dielectric reflectors 80a is integrated into the insulating layer 16 or arranged on the insulating layer 16. The dielectric reflectors 80a, 80b may comprise multiple layers having different refractive indices to provide the desired reflectivity. The micro-resonator 28 includes a void between the high-purity silicon layer 20 and the upper dielectric reflector, which may be filled with a material or may be evacuated. In order to achieve a suitable beam confinement within the resonator cavity, the upper dielectric reflector 80 has a curved shape. The upper dielectric reflector 80b may be formed within or on a further insulating layer. For instance, the thickness of the high-purity silicon layer 20 may be about 2 μm. However, according to other exemplary embodiments, the thickness may be in the range from 0.2 μm to about 1 mm Within the resonator cavity a standing optical wave may be achieved resulting in a distribution of the electrical field, which is schematically indicated by the distribution 110. The field distribution within the high-purity silicon layer 20 allows an efficient coupling of the optical wave confined in the resonator cavity and the REE dopants integrated in the high-purity silicon layer 20.

LIST OF REFERENCE NUMERALS

10 photonic element for quantum information processing device
12 silicon-on-insulator wafer
14 seed layer
16 insulating layer
18 silicon wafer
20 high-purity silicon layer
22 REE dopant(s)
24 waveguide
26 supporting substrate
28 micro-resonator
30 coupling waveguide
32 signal converter
34 electrode
36 inductance
38 nonlinear inductance
40 tip of waveguide
50 quantum information processing device
52 refrigerator
54 optical inputs
56 optical connector
58 outer control box
60 inner control box
62 electrical connectors
64 photodetector
68 hole (micro-structure)
70a, 70b Bragg grating
72 microwave generator
80a, 80b dielectric reflectors
100 depth profile of implanted REE dopants
102 implantation of REE dopants
104 central region
106, 108 light pulses
110 electric field distribution

The invention claimed is:

1. A photonic element for a quantum information processing device, the photonic element comprising:
a high-purity silicon layer,
wherein the high-purity silicon layer contains integrated rare-earth element (REE) dopants at a concentration of $10^{19}$ cm$^{-3}$ or less, and
wherein an optical transition between lowest crystal field levels of the REE dopants integrated in the high-purity silicon layer exhibits a homogeneous linewidth of 1 MHz or less at a temperature of 4 K or less corresponding to a coherence time of 318 ns or less.

2. The photonic element according to claim 1, wherein the concentration of REE dopants in the high-purity silicon layer is at least by a factor of two higher than a concentration of oxygen in the high-purity silicon layer.

3. The photonic element according to claim 2, wherein the concentration of REE dopants in the high-purity silicon layer is at least by a factor of two higher than a concentration of any other contaminants and/or defects in the high-purity silicon layer.

4. The photonic element according to claim 1, wherein the concentration of REE dopants in the high-purity silicon layer is at least by a factor of three, optionally at least by a factor of five, and optionally at least by a factor of ten higher than a concentration of oxygen and/or any other contaminants and/or defects in the high-purity silicon layer.

5. The photonic element according to claim 1, wherein the REE dopants comprise or consist of erbium dopants.

6. The photonic element according to claim 5, wherein the optical transition between the lowest crystal field levels of the erbium dopants has an emission wavelength in a range from 1.532 μm to 1.542 μm.

7. The photonic element according to claim 1, wherein the high-purity silicon layer has an oxygen impurity concentration of $5 \cdot 10^{18}$ cm$^{-3}$ or less.

8. The photonic element according to claim 1, wherein the integrated REE dopants are integrated at lattice sites of the silicon crystal structure that lead to optical transitions out of the lowest crystal field levels of the REE dopants at one or more of following wavelengths: 1536.1 nm, 1553.5 nm, 1557.8 nm, 1573.4 nm, 1584.5 nm, 1593.6 nm, 1537.8 nm, 1558.8 nm, 1562.6 nm, 1581.7 nm, 1590.1 nm, and 1599.1 nm, each with an uncertainty of +/−0.5 nm, and/or wherein the transition between the lowest crystal field levels exhibits an inhomogeneous linewidth of 10 GHz or less at a temperature of 20 K or less.

9. The photonic element according to claim 1, wherein the REE dopants integrated in the high-purity silicon layer exhibit higher lying crystal field sub-levels having a separation from the respective lowest crystal field level of at least 1.5 THz in a ground state and of at least 1 THz in a first excited state at a temperature of 4 K or less.

10. The photonic element according to claim 1, wherein the optical transition between the lowest crystal field levels of the REE dopants integrated in the high-purity silicon layer exhibit an electric dipole contribution, such that a radiative decay time of an optically excited state of the REE dopants is 0.9 ms or less.

11. The photonic element according to claim 1, wherein the optical transition between the lowest crystal field levels of the REE dopants integrated in the high-purity silicon layer has a homogenous linewidth of 50 kHz or less at a temperature of 4 K or less.

12. The photonic element according to claim 1, wherein at least part of the high-purity silicon layer containing the REE dopants is single-crystalline or polycrystalline with a grain size of at least 50 nm.

13. The photonic element according to claim 1, wherein a homogeneous strain profile of the crystalline high-purity silicon layer has a lattice constant fluctuation of less than 1% at least in a part of the high-purity silicon layer comprising the integrated REE dopants.

14. The photonic element according to claim 1, wherein the high-purity silicon layer is made of isotopically purified silicon.

15. The photonic element according to claim 1, further comprising a seed layer formed of silicon, wherein the high-purity silicon layer is attached to the seed layer.

16. The photonic element according to claim 15, further comprising an insulating layer having a low index of refraction of 2.4 or less for optical radiation at a wavelength of 1.55 μm, wherein the seed layer is attached to the insulating layer.

17. The photonic element according to claim 16, wherein the insulating layer comprises or consists of $SiO_2$ and/or SiN.

18. The photonic element according to claim 16, wherein the insulating layer and the seed layer are parts of a silicon-on-insulator wafer.

19. The photonic element according to claim 15, wherein the high-purity silicon layer is attached to the seed layer by using an epitaxial technique selected from at least one of following techniques: chemical vapor deposition, physical vapor deposition, and molecular beam epitaxy.

20. The photonic element according to claim 16, wherein the high-purity silicon layer is provided by thinning a bulk silicon crystal and/or a thin silicon slab attached to the seed layer or the insulating layer.

21. The photonic element according to claim 15, wherein the photonic element forms an optical waveguide and wherein the optical waveguide is adapted to guide optical radiation within the high-purity silicon layer.

22. The photonic element according to claim 1, wherein the crystalline high-purity silicon layer has a surface roughness of 1 nm RMS or less.

23. The photonic element according to claim 1, wherein the photonic element is formed as a nanophotonic device.

24. The photonic element according to claim 1, included in an optical wave guide.

25. The photonic element according to claim 1, included in an optical resonator, wherein the optical resonator includes one or more reflectors forming a resonator cavity at least partly containing the photonic element.

26. The photonic element according to claim 1, included in a single photon emitter.

27. The photonic element according to claim 1, included in a quantum repeater, wherein the photonic element is optionally configured to serve as a quantum memory for photons, and/or a single-photon emitter.

28. The photonic element according to claim 1, included in a quantum information processing device, wherein the photonic element is optionally configured to serve as a quantum memory for photons, and/or a optical waveguide, and/or an optical resonator.

29. The photonic element according to claim 1, included in a signal converter for converting microwave signals into optical signals in a telecommunications wavelength range, wherein the signal converter further includes an optical waveguide and/or an optical resonator.

30. The photonic element according to claim 1, included in an optical interconnection for remote quantum computers, wherein the optical interconnection further includes an optical waveguide and/or an optical resonator.

31. A method for optically reading and/or controlling a state of a spin qubit comprising utilizing the photonic element according to claim 1.

32. A method for operating a photon-mediated quantum gate between two or more qubits comprising utilizing the photonic element according to claim 1.

33. A method for producing a photonic element for a quantum information processing device, the method comprising:
providing a high-purity silicon layer; and
integrating rare-earth element (REE) dopants into the high-purity silicon layer, such that the high-purity silicon layer contains the integrated REE dopants at a concentration of $1 \cdot 10^{19}$ $cm^{-3}$ or less, and wherein an optical transition between lowest crystal field levels of the REE dopants integrated in the high-purity silicon layer exhibits a homogeneous linewidth of 1 MHz or less at a temperature of 4 K or less corresponding to a coherence time of 318 ns or less.

34. The method according to claim 33, wherein the high-purity silicon layer is provided as a silicon-on-insulator wafer and wherein the high-purity silicon layer has a concentration of impurities of $1 \cdot 10^{17}$ $cm^{-3}$ or less and optionally of $1 \cdot 10^{16}$ $cm^{-3}$ or less.

35. The method according to claim 34, wherein the silicon-on-insulator wafer is provided as a float zone (FZ) silicon-on-insulator wafer.

36. The method according to claim 34, wherein providing the high-purity silicon layer is provided by polishing the silicon-on-insulator wafer such that the high-purity silicon layer has a thickness of at least 10 nm and not more than 5 μm.

37. The method according to claim 34, wherein the REE dopants are integrated at a concentration of $1 \cdot 10^{17}$ $cm^{-3}$ or more.

38. The method according to claim 33, wherein integrating the REE dopants comprises implanting the REE dopants into the high-purity silicon layer.

39. The method according to claim 33, wherein the method further comprises annealing the high-purity silicon layer at a temperature between 500° C. and 650° C.

40. The method according to claim 33, wherein providing the high-purity silicon layer comprises depositing the high-purity silicon layer onto a seed layer using an epitaxial technique selected from the group of: chemical vapor deposition, physical vapor deposition, and molecular beam epitaxy.

41. The method according to claim 40, wherein depositing the high-purity silicon layer and integrating the REE dopants are carried out at least partly simultaneously.

42. The method according to claim 40, wherein during depositing the high-purity silicon layer and integrating the REE dopants the seed layer is at least partly kept at a temperature between 300° C. and 650° C.

43. The method according to claim 33, wherein integrating the REE dopants is carried out at least partly after completion of depositing the high-purity silicon layer.

44. The method according to claim 40, wherein depositing the high-purity silicon layer onto the seed layer comprises depositing isotopically purified silicon and/or silicon having a controlled isotopic composition.

45. The method according to claim 33, wherein providing the crystalline high-purity silicon layer includes providing a bulk high-purity silicon crystal and thinning the high-purity silicon crystal down to a predetermined thickness of the crystalline high-purity silicon layer and/or polishing the bulk high-purity silicon crystal.

46. The method according to claim 44, wherein the high-purity silicon layer is kept at a temperature between 300° C. and 650° C. during at least a part of the integrating the REE dopants into the high-purity silicon layer.

47. The method according to claim 33, wherein integrating the REE dopants into the high-purity silicon layer comprises at least one implantation step and at least one annealing step, wherein during the annealing step the high-purity silicon layer is kept at a temperature between 300° C. and 650° C.

48. The method according to claim 47, wherein integrating the REE dopants into the high-purity silicon layer comprises multiple implantation steps and multiple annealing steps in an alternating order.

49. The method according to claim 34, wherein the temperature is selected based on an implantation dose and/or based on an implantation energy.

50. The method according to claim 33, wherein the implantation of REE dopants into the high-purity silicon layer is carried out in a spatially selective manner, and wherein spatial selection of the implantation is optionally based on applying a mask during the implantation process.

51. The method according to claim 33, wherein providing the high-purity silicon layer comprises providing multiple sub-layers of the high-purity silicon layer, wherein integrating the REE dopants into the high-purity silicon layer comprises multiple implantation steps, and wherein the steps of providing sub-layers of the high-purity silicon layer and the implantation steps are optionally arranged in an alternating order.

* * * * *